United States Patent [19]
Watson et al.

[11] Patent Number: 5,912,666
[45] Date of Patent: Jun. 15, 1999

[54] OBJECT-ORIENTED GLOBAL CURSOR TOOL

[75] Inventors: Ralph T. Watson, Cupertino; Jack R. Robson, Boulder Creek; Ryoji Watanabe, Cupertino; Jeff Wishnie, San Francisco, all of Calif.

[73] Assignee: Object Technology Licensing Corp., Cupertino, Calif.

[21] Appl. No.: 08/844,758

[22] Filed: Apr. 22, 1997

Related U.S. Application Data

[63] Continuation of application No. 08/777,012, Jan. 7, 1997, abandoned, which is a continuation of application No. 08/295,442, Aug. 23, 1994, abandoned.

[51] Int. Cl.⁶ .................. G06F 3/14; G06F 9/46
[52] U.S. Cl. .......... 345/339; 345/335; 345/334; 345/145; 395/682; 395/683
[58] Field of Search ................ 345/339, 335, 345/334, 346, 340, 348, 349, 352, 354, 145, 156, 902, 146; 395/682, 683, 680

[56] References Cited

U.S. PATENT DOCUMENTS

| | | | |
|---|---|---|---|
| 4,742,473 | 5/1988 | Shugar et al. | 345/352 |
| 4,821,220 | 4/1989 | Duisberg | 364/578 |
| 4,885,717 | 12/1989 | Beck et al. | 395/683 X |
| 4,891,630 | 1/1990 | Friedman et al. | 345/156 |
| 4,939,507 | 7/1990 | Beard et al. | 345/156 |
| 4,953,080 | 8/1990 | Dysart et al. | 707/103 |
| 4,975,690 | 12/1990 | Torres | 345/340 |
| 4,984,152 | 1/1991 | Muller | 345/348 X |
| 5,041,992 | 8/1991 | Cunningham et al. | 345/145 X |
| 5,050,090 | 9/1991 | Golub et al. | 364/478.05 |
| 5,060,276 | 10/1991 | Morris et al. | 382/151 |
| 5,075,848 | 12/1991 | Lai et al. | 711/152 |
| 5,093,914 | 3/1992 | Coplien et al. | 395/704 |
| 5,119,475 | 6/1992 | Smith et al. | 345/333 X |
| 5,125,091 | 6/1992 | Staas, Jr. et al. | 395/671 |
| 5,133,075 | 7/1992 | Risch | 707/201 |
| 5,136,705 | 8/1992 | Stubbs et al. | 395/183.03 |
| 5,142,618 | 8/1992 | Fujiwara et al. | 707/516 |
| 5,151,987 | 9/1992 | Abraham et al. | 395/182.18 |
| 5,181,162 | 1/1993 | Smith et al. | 707/530 |
| 5,185,596 | 2/1993 | Freeman | 345/145 X |
| 5,204,947 | 4/1993 | Bernstein et al. | 345/146 X |
| 5,233,687 | 8/1993 | Henderson, Jr. et al. | 345/346 |
| 5,276,816 | 1/1994 | Cavendish et al. | 345/348 |
| 5,293,470 | 3/1994 | Birch et al. | 345/339 X |
| 5,307,457 | 4/1994 | Beitel et al. | 345/348 |
| 5,313,636 | 5/1994 | Noble et al. | 395/683 X |
| 5,315,703 | 5/1994 | Matheny et al. | 345/326 X |
| 5,315,709 | 5/1994 | Alston, Jr. et al. | 707/6 |
| 5,317,741 | 5/1994 | Schwanke | 395/703 |
| 5,321,841 | 6/1994 | East et al. | 395/684 X |
| 5,325,481 | 6/1994 | Hunt | 345/334 X |
| 5,325,522 | 6/1994 | Vaughn | 707/1 |
| 5,325,524 | 6/1994 | Black et al. | 707/10 |
| 5,325,533 | 6/1994 | McInerney et al. | 395/701 |
| 5,452,416 | 9/1995 | Hilton et al. | 345/346 |
| 5,485,569 | 1/1996 | Goldman et al. | 345/326 X |
| 5,548,304 | 8/1996 | Yoshino et al. | 345/145 |
| 5,572,648 | 11/1996 | Bibayan | 345/340 |
| 5,588,105 | 12/1996 | Foster et al. | 345/348 X |
| 5,603,053 | 2/1997 | Gough et al. | 345/156 X |
| 5,655,093 | 8/1997 | Frid-Nielsen | 345/334 X |

FOREIGN PATENT DOCUMENTS

A 0 533607  3/1993  European Pat. Off. .

OTHER PUBLICATIONS

Cowart, "Mastering Windows 3.1 Special Edition", SYBEX Inc., pp. 357, 363–367; screen printouts 1–9, 1993.
Alferi, "The Best Book of WordPerfect Version 5.0", Aston-Tate, pp. 6, 29, 72, 73, 217, 218, 536, 1988.

*Primary Examiner*—Raymond J. Bayerl
*Attorney, Agent, or Firm*—Kudirka & Jobse; James A. Ward

[57] ABSTRACT

A system and method provide a cursor tool framework and tool server with support for multiple cursors on any given system, and supports the selection of a cursor tool utilizing a cursor. The framework and server facilitate the association of cursor tools to a cursor in a process independent space such that tools can be used cross-process and cross-document. The framework also provides default functionality for communication among cursor tools and the canvas on which they are used. This high degree of interaction allows any cursor tool and any document to function together such that the cursor tool can be written without the knowledge of the document developer.

36 Claims, 14 Drawing Sheets

| | Window | Frame |
|---|---|---|
| Activate On | Mouse-up | Mouse-down |
| First Click | can select and drag only | can alter contents |

OBJECT-ORIENTED GLOBAL CURSOR TOOL

This application is a continuation, under 37 CFR §1.53, of application Ser. No. 08/777,012, filed on Jan. 7, 1997, now abandoned, which is a continuation of application Ser. No. 08/295,442, filed on Aug. 23, 1994, now abandoned.

COPYRIGHT NOTIFICATION

Portions of this patent application contain materials that are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

This invention generally relates to improvements in computer systems and more particularly to a system and method for employing tool objects and menu of tool object in an object-oriented operating system.

BACKGROUND OF THE INVENTION

Cursor tools specify a particular mode of user interaction with a document or frame by changing the behavior of the user controlled "cursor." For example, a user can select a "rectangle" cursor tool to indicate to the operating environment that pressing the mouse button and dragging the mouse will result in the creation of a rectangle on a document drawing canvas. Tools can indicate modes for data selection, manipulation, or creation. Prior art examples of cursor tools can be found in applications such as MacPaint® or MacDraw®. However, these applications did not provide the user with management of more than one cursor at a time. Further, no integration into the operating system was provided to allow a tool active in one application to function in another application.

SUMMARY OF THE INVENTION

An innovative system and method apply object-oriented techniques to integrate cursor tools into an object-oriented operating system. This integration includes management of multiple cursor tools in multiple tasks at the same time. A cross application tool server capability is provided allowing any cursor tool and any application to function together. This unique capability includes cross-partition memory management allowing cursor tool usage across applications and across partitions. The object-oriented framework provides an architecture for the distribution of cursor tools across applications so that application requirements can be unaware of tools until the cursor tool function is requested.

DETAILED DESCRIPTION OF THE INVENTION

Figure 1:
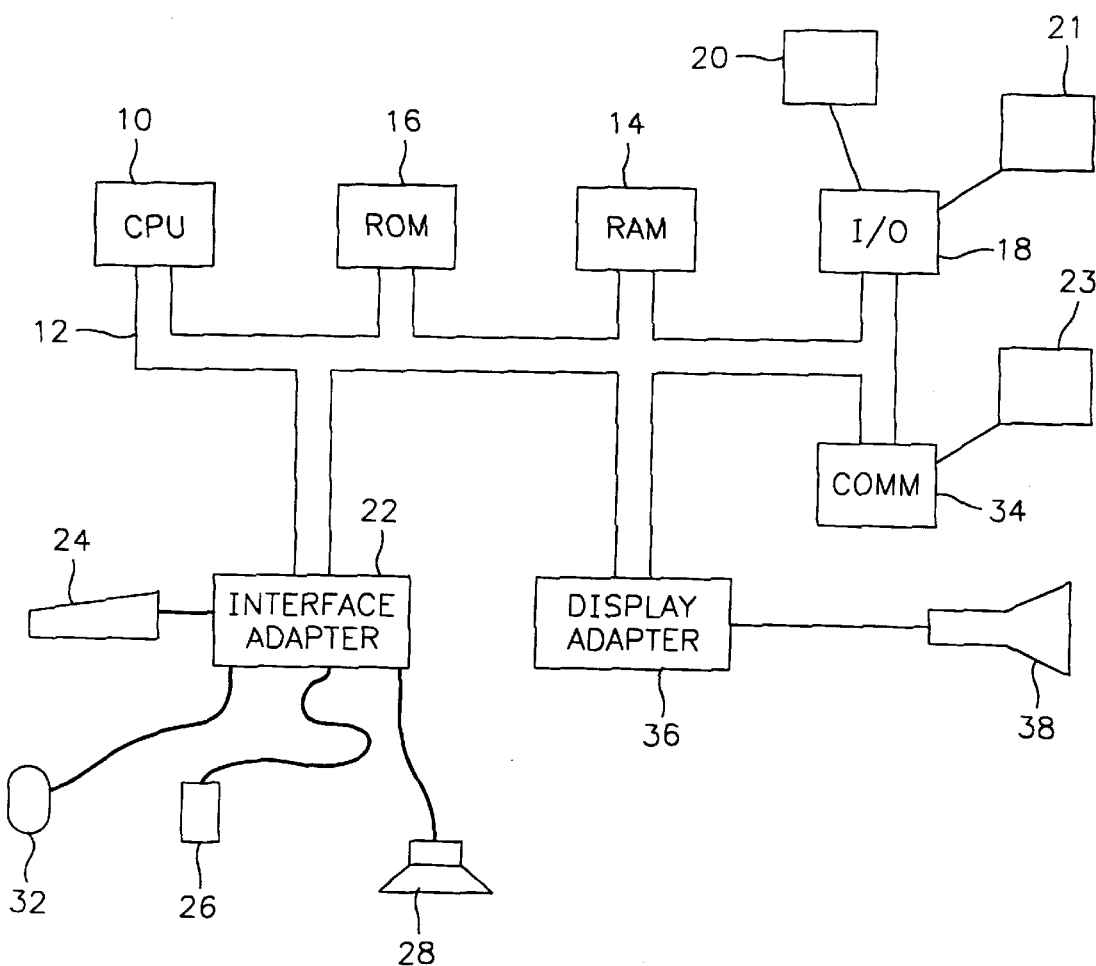
FIG. 1 is a block diagram of a personal computer system in accordance with a preferred embodiment.

The invention is preferably practiced in the context of an operating system resident on a personal computer such as the IBM® PS/2® or Apple® Macintosh® computer. A representative hardware environment is depicted in FIG. 1, which illustrates a typical hardware configuration of a computer in accordance with the subject invention having a central processing unit 10, such as a conventional microprocessor, with a built in non-volatile storage 11, and a number of other units interconnected via a system bus 12. The workstation shown in FIG. 1 includes a Random Access Memory (RAM) 14, Read Only Memory (ROM) 16, an I/O adapter 18 for connecting peripheral devices such as a disk unit 20, and a diskette unit 21 to the bus, a user interface adapter 22 for connecting a keyboard 24, a mouse 26, a speaker 28, a microphone 32, and/or other user interface devices such as a touch screen device (not shown) to the bus, a communication adapter 34 for connecting the workstation to a data processing network 23 and a display adapter 36 for connecting the bus to a display device 38. The computer has resident thereon an operating system such as the Apple System/7® operating system.

Object Oriented Programming Techniques

In a preferred embodiment, the invention is implemented in the C++ programming language using object-oriented programming techniques. As will be understood by those skilled in the art, Object-Oriented Programming (OOP) objects are software entities comprising data structures and operations on the data. Together, these elements enable objects to model virtually any real-world entity in terms of its characteristics, represented by its data elements, and its behavior, represented by its data manipulation functions. In this way, objects can model concrete things like people and computers, and they can model abstract concepts like numbers or geometrical concepts. The benefits of object technology arise out of three basic principles: encapsulation, polymorphism and inheritance.

As an aid to persons less versed in object-oriented principles, a class is a data structure that serves as a pattern for the creation of objects. A class can be thought of as a programmer-defined type, in which data members and the member functions of objects belonging to the class are defined.

In object-oriented programming, an object is a representation of an entity in terms of its attributes (the data it can contain) and its behaviors (the operations it can perform on that data). An object can represent a programming entity such as a pushdown stack, a window, a dialog box, or it can represent an abstraction of a real-world entity such as a chess piece or a rectangle. An object is an instance of a class, and the class serves as a template for creating objects. In C++ objects can be created either at compile time or at runtime.

In object-oriented programming, a mixing class is a class used to enhance the attributes and behaviors of a defined class using multiple inheritance which complement characteristics inherited from its primary base class. By design a mixing class is incomplete so it would not be used as a sole base class. By convention, mixing classes are identified by having the first letter of their name begin with a "M," for example, MGraphic and MResponder. Inheritance refers to the means by which a class includes in itself the behavior and type of another class, known as its base class, from which it is derived.

Instantiate is the creation of an object from a class.

A framework refers to a group of interrelated classes that provides a pre-fabricated structure to solve a set of related problems. A framework can be thought of as a skeleton program that is meant to be fleshed out by the programmer, with the sections of code provided by the programmer, and called by the framework.

Objects hide, or encapsulate, the internal structure of their data and the algorithms by which their functions work. Instead of exposing these implementation details, objects present interfaces that represent their abstractions cleanly with no extraneous information. Polymorphism takes encapsulation a step further. The idea is many shapes, one interface. A software component can make a request of another component without knowing exactly what that component is. The component that receives the request interprets it and determines, according to its variables and data, how to execute the request. The third principle is inheritance, which allows developers to reuse pre-existing design and code. This capability allows developers to avoid creating software from scratch. Rather, through inheritance, developers derive subclasses that inherit behaviors, which the developer then customizes to meet their particular needs.

A prior art approach is to layer objects and class libraries in a procedural environment. Many application frameworks on the market take this design approach. In this design, there are one or more object layers on top of a monolithic operating system. While this approach utilizes all the principles of encapsulation, polymorphism, and inheritance in the object layer, and is a substantial improvement over procedural programming techniques, there are limitations to this approach. These difficulties arise because it is easy for a developer to reuse their own objects, it is difficult to use objects from other systems, and a developer still needs to reach into the internal, non-object layers with procedural Operating System (OS) calls.

Another aspect of object oriented programming is a framework approach to application development. One of the most rational definitions of frameworks come from Ralph E. Johnson of the University of Illinois and Vincent F. Russo of Purdue. In their 1991 paper, Reusing Object-Oriented Designs, University of Illinois tech report UIUCDCS91-1696 they offer the following definition: "An abstract class is a design of a set of objects that collaborate to carry out a set of responsibilities. Thus, a framework is a set of object classes that collaborate to execute defined sets of computing responsibilities." From a programming standpoint, frameworks are essentially groups of interconnected object classes that provide a pre-fabricated structure of a working application. For example, a user interface framework might provide the support and "default" behavior of drawing windows, scroll bars, menus, etc. Since frameworks are based on object technology, this behavior can be inherited and overridden to allow developers to extend the framework and create customized solutions in a particular area of expertise. This is a major advantage over traditional programming since the programmer is not changing the original code, but rather extending the software. In addition, developers are not blindly working through layers of code because the framework provides architectural guidance and modeling but at the same time frees them to then supply the specific actions unique to the problem domain.

From a business perspective, frameworks can be viewed as a way to encapsulate or embody expertise in a particular knowledge area. Corporate development organizations, Independent Software Vendors (ISV)s and system integrators have acquired expertise in particular areas, such as manufacturing, accounting, or currency transactions. This expertise is embodied in their code. Frameworks allow organizations to capture and package the common characteristics of that expertise by embodying it in the organization's code. First, this allows developers to create or extend an application that utilizes the expertise, thus the problem gets solved once and the business rules and design are enforced and used consistently. Also, frameworks and the embodied expertise behind the frameworks have a strategic asset implication for those organizations which have acquired expertise in vertical markets such as manufacturing, accounting, or biotechnology have a distribution mechanism for packaging, reselling, and deploying their expertise, and furthering the progress and dissemination of technology.

Historically, frameworks have only recently emerged as a mainstream concept on computing platforms. This migration has been assisted by the availability of object-oriented languages, such as C++. Traditionally, C++ was found mostly on UNIX systems and researcher's workstations, rather than on computers in commercial settings. It is languages such as C++ and other object-oriented languages, such as Smalltalk and others, that enabled a number of university and research projects to produce the precursors to today's commercial frameworks and class libraries. Some examples of these are InterViews from Stanford University, the Andrew toolkit from Carnegie-Mellon University and University of Zurich's ET++ framework.

There are many kinds of frameworks depending on the level of the system and the nature of the problem. The types of frameworks range from application frameworks that assist in developing the user interface, to lower level frameworks that provide basic system software services such as communication, printing, file systems support, graphic, etc. Commercial examples of application frameworks are MacApp (Apple), Bedrock (Symantec), OWL (Borland), NeXTStep App Kit (NeXT), and Smalltalk-80 MVC (ParcPlace).

Programming with frameworks requires a new way of thinking for developers accustomed to other kinds of systems. In fact, it is not like "programming" at all in the traditional sense. In old-style operating systems such as DOS or UNIX, the developer's own program provides all of the structure. The operating system provides services through system calls—the developer's program makes the calls when it needs the service and control returns when the service has been provided. The program structure is based on the flow-of-control, which is embodied in the code the developer writes.

When frameworks are used, this is reversed. The developer is no longer responsible for the flow-of-control. The developer must forego the tendency to understand programming tasks in term of flow of execution. Rather, the thinking must be in terms of the responsibilities of the objects, which must rely on the framework to determine when the tasks should execute. Routines written by the developer are activated by code the developer did not write and that the developer never even sees. This flip-flop in control flow can be a significant psychological barrier for developers experienced only in procedural programming. Once this is understood, however, framework programming requires much less work than other types of programming.

In the same way that an application framework provides the developer with prefab functionality, system frameworks, such as those included in a preferred embodiment, leverage the same concept by providing system level services, which developers, such as system programmers, use to subclass/override to create customized solutions. For example, consider a multi-media framework which could provide the foundation for supporting new and diverse devices such as audio, video, MIDI, animation, etc. The developer that needed to support a new kind of device would have to write a device driver. To do this with a framework, the developer only needs to supply the characteristics and behavior that is specific to that new device.

The developer in this case supplies an implementation for certain member functions that will be called by the multi-media framework. An immediate benefit to the developer is that the generic code needed for each category of device is already provided by the multi-media framework. This means less code for the device driver developer to write, test, and debug. Another example of using system frameworks implements I/O frameworks for SCSI devices, NuBus cards, and graphic devices. Because there is inherited functionality, each framework provides support for common functionality found in its device category. Other developers depend on these consistent interfaces various other devices.

A preferred embodiment takes the concept of frameworks and applies it throughout the entire system. For the commercial or corporate developer, system integrator, or OEM, this means all the advantages that have been illustrated for a framework such as MacApp can be leveraged not only at the application level for such things as text and user interfaces, but also at the system level, for services such as graphics, multi-media, file systems, I/O, testing, etc.

Application creation in the architecture of a preferred embodiment is essentially like writing domain-specific puzzle pieces that adhere to the framework protocol. In this manner, the whole concept of programming changes. Instead of writing line after line of code that calls multiple API hierarchies, software will be developed by deriving classes from preexisting frameworks within this environment, and then adding new behavior and/or overriding inherited behavior as desired.

Thus, the developer's application becomes the collection of code that is written and shared with all the other framework applications. This is a powerful concept because developers will be able to build on each other's work. This also provides the developer the flexibility to customize as much or as little as needed. Some frameworks will be used just as they are. In some cases, the amount of customization will be minimal, so the puzzle piece the developer plugs in will be small. In other cases, the developer may make very extensive modifications and create something completely new. In a preferred embodiment, as shown in FIG. 1, a program resident in the RAM 14, and under the control of the CPU 10, is responsible for managing various tasks using an object oriented graphic framework. The program employs a new architecture to implement cursor tools. "Tools" are normally associated with icons that can be clicked to select the tool. Once selected, the tool, which can optionally change the cursor's shape, allows a user to draw in the content region of a document. MacPaint's paint-brush tool is a classic example of a cursor tool. These tools are referred to as cursor tools because they change the cursor and effect the data directly under the cursor. Characteristics that are associated with cursor tools include selection by clicking on a tool icon; and changing the current cursor shape to indicate a user is "holding" the selected tool. Cursor tools come in various types including creators, selectors, and selector/effectors. Creators are active over the content region of the active document. Selectors and Selector/Effectors are active only over frames of a type they understand, in the active document. If the view cannot use the tool, then the standard arrow cursor should apply. For example, if a yellow highlighting tool is selected, and the cursor is moved over an editable text view, the cursor changes to the image of a yellow highlighter. If a transliteration tool is selected and the cursor is moved over a graphic image, then nothing unusual would happen.

The code for this process is described below:

The desired accomplishment below is to show the minimal code necessary to create a view that will interact with a tool. In order to be able to work with tools, this view must eventually mixing or subclass classes that can provide information about tools and input device events. In a simple implementation, the view could subclass MToolHandler to handle tools and MMouseEventHandler to receive MouseEntered and MouseExited events. This view overrides the following MMouseEventHandler methods to determine when the cursor has entered its boundaries:

virtual Boolean MouseEntered (TMouseMovedEvent& mouseEnter);

virtual Boolean MouseExited (TMouseMovedEvent& mouseExit);

These two methods are called automatically as these events occur. The code that actually changes the cursor's image does so by first getting the current tool. If there is a valid current tool, it is asked to create its desired cursor graphic (an MGraphic). This graphic is then used to set the graphic of a TCursor, which is a static object representing the current cursor associated with the current input device (such as a mouse). The code would look something like this:

```
Boolean TYourView::MouseEntered (TMouseMovedEvent& mouseEvent)
{
    TTool* tool = TTool::CopyCurrentTool ( );
    if ( tool != NIL ) {
        MGraphic* cursorGraphic = tool->CreateCursorGraphic( );
        if ( cursorGraphic != NIL ) {
            TCursor theCursor;
            theCursor.SetGraphic (*cursorGraphic);
        }
        delete cursorGraphic;
    }
    delete tool;
    return FALSE; // let other event handlers have event
}
```

When the cursor leaves the area over the view, the cursor image should revert back to either the standard arrow cursor or whatever the cursor image was before. An example of C++ code in accordance with a preferred embodiment is presented below. One of ordinary skill in the art will realize that increases in performance can be obtained by caching the graphic image of the original cursor and as many of the cursor tool images as is practical to save in cache.

```
Boolean TYourView::MouseExited (TMouseMovedEvent& mouseEvent)
{
    TCursor theCursor;
    theCursor.SetGraphic (TStandardArrowTool.CreateCursorGraphic( ));
    // back to arrow
    return FALSE; // let other event handlers have event
}
```

It is possible that when a tool is selected (from a palette or other tool cluster), it might be desirable to change the cursor image at that time. The same process would occur whereby the code that sets the current tool would query the selected tool to obtain its cursor graphic, then it would pass that MGraphic to TCursor::SetGraphic.

Persistence

In the Apple Macintosh computer, the selected cursor tool persists within an application. For example, if you select the paint-brush tool in MacPaint, switch to MacDraw and select the Rectangle tool, and then switch back to MacPaint, the selected tool will be the paint-brush—the last tool you selected in MacPaint. In a preferred embodiment, tools will persist within a place, but not across places. For example, if a rectangle cursor tool is selected in one application, it will remain the selected cursor tool no matter which frame or document is made active.

Examples of Cursor Tools

There are two standard types of Cursor Tools: The TSimpleMouseTool and the TDelegatingMouseTool. The delegating mouse tool is a cursor tool that requests its instructions from the view that is being clicked in. These instructions are in the form of an "Interactor", which is an object that supplies information such as what to do while the mouse button is held down, what to do when the mouse is incrementally moved, and what to do when the mouse button is released. The other type of tool, the simple mouse tool, starts its own interactor. This is to say that it defines what it will do when it is used to click on an appropriate tool handling view or target. Common examples of tools are:

A polygon cursor tool: 
The arrow selection cursor tool: 
A color-grabber ("eye-dropper") cursor tool: 

Cursor Tool Cluster

Figure 2:
FIG. 2 is an example of a prior art cursor tool cluster used in MacDraw.

Clusters are a means for logically and visually grouping related cursor tools. One can think of them as a view that holds various cursor tools. FIG. 2 is an example of a prior art cursor tool cluster used in MacDraw.

Command Panels

Command panels group and organize all of a frame's commands that do not appear directly on the frame furniture or in a frame's menu. Command panels provide interfaces to these commands through cursor tools (clustered or not), buttons, sliders, pull-down menus, scrolling lists, text-fields, additional panels, or any custom control a developer may create.

All command panels contain a frame-creation tool. This is a cursor tool that can be used to draw a frame of the type represented by the panel. For example, to instantiate a tool which could be used to create an Editable Text frame, the code would be as follows:

```
TTool* myTool = new
    TFrameCreationToolFor<TStandardTextModel,
    TTextPresenterState>( );
```

TStandardTextModel is the model associated with editable text, while the TTextPresenterState is the presenter state editable text uses. Since the TFrameCreationToolFor is a templatized class, any combination of model/presenter state could be used to create an instance of a tool.

When the frame creation tool is used to select an area in an appropriate tool handling document (such as one capable of embedding an editable text model), an editable text frame is created and embedded in said document. In order to support the creation of frames, a view would need to handle tools in general as well as mixing the MFrameCreationToolHandler class. Beyond adding this class, the following method would be implemented:

```
void TSimpleEmbedderContentView::AdoptEmbedderModel(
        TEmbedderModel* theModel,
        TGPoint whereDropped, TGPoint frameSize)
{
    TSimpleEmbedderSelection* theSelection =
        new TSimpleEmbedderSelection( GetModelReference( ));
```

```
theSelection->SetInsertionPoint(whereDropped);
TAbsorbDataCommand* theCommand = new TAbsorbDataCommand(theModel);
TDocumentComponentCommandBindingTo<MDataExchanger>* theBinding = NIL;
theBinding =
    new TGUIDocumentComponentCommandBindingTo<MDataExchanger>(
    theCommand, theSelection, *GetGUIBundle( ),
    TStandardText("AcceptDrop"));
::NonConst( (TDocumentComponentView *) this)->AdoptAndDo( theBinding );
}
```

This method is called automatically by the MFrameCreationTool-Handler class when a tool of type MrameCreationToolFor is used.

The relationship between a command panel and its frames is similar to the relationship between an application and its documents. The command panel can be used to create its frames, and it holds much of the interface for manipulating the frame and its contents. But there is a significant difference. In prior art tool systems, the application owns its documents, literally surrounding them. In a preferred embodiment, the document is supreme. The document owns and surrounds the frames, the command panel is simply a tool that a user can employ, using it to create or manipulate frames in a document.

In this model, an application is simply a command panel and a stationery pad designed to provide an interface to the commands for a frame of a particular type, and provide a frame creation cursor tool for the frame of its type. Command panels group controls that work on a single frame-type together, and vendors will often create a command panel for each of their frame types, so command panels may appear to group controls by vendor. For example, WordPerfect would develop a Wordperfect command panel for their Wordperfect frame type. For common frame-types, such as graph edit applications, there may be several different command panels. Command panels could eventually be user constructable, so that users could group all their image manipulation controls, from whatever vendor they choose, on a single command panel.

Figure 3:
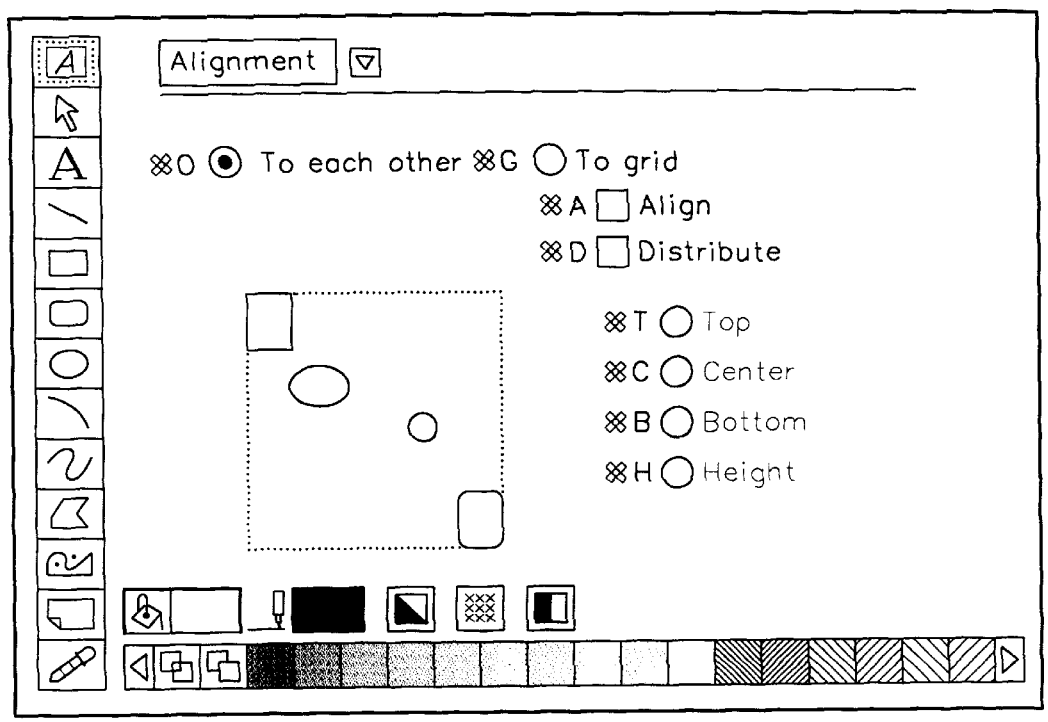
FIG. 3 is a command panel in accordance with a preferred embodiment.

A command can be accessed through the global command panel container or a command panel bar. The command panel for the active frame can be brought to the front with a multiple key sequence, such as a control-key press. FIG. 3 is a command panel in accordance with a preferred embodiment.

The command panel bar contains icons that represent various command panels that a user may have installed. In addition, the top two icons on the bar are special: the topmost icon always represents the command panel for the active frame, and the second icon always contains a command panel with a cluster of tools that apply globally to any frame-type. The icons include a selection arrow and an optional magnifier and color-grabber. Unlike earlier designs which suggested that the command panel bar would be filled with all the command panels of the frames in a document, or on the desktop, in this design, the user determines which panels are available.

Figure 4:
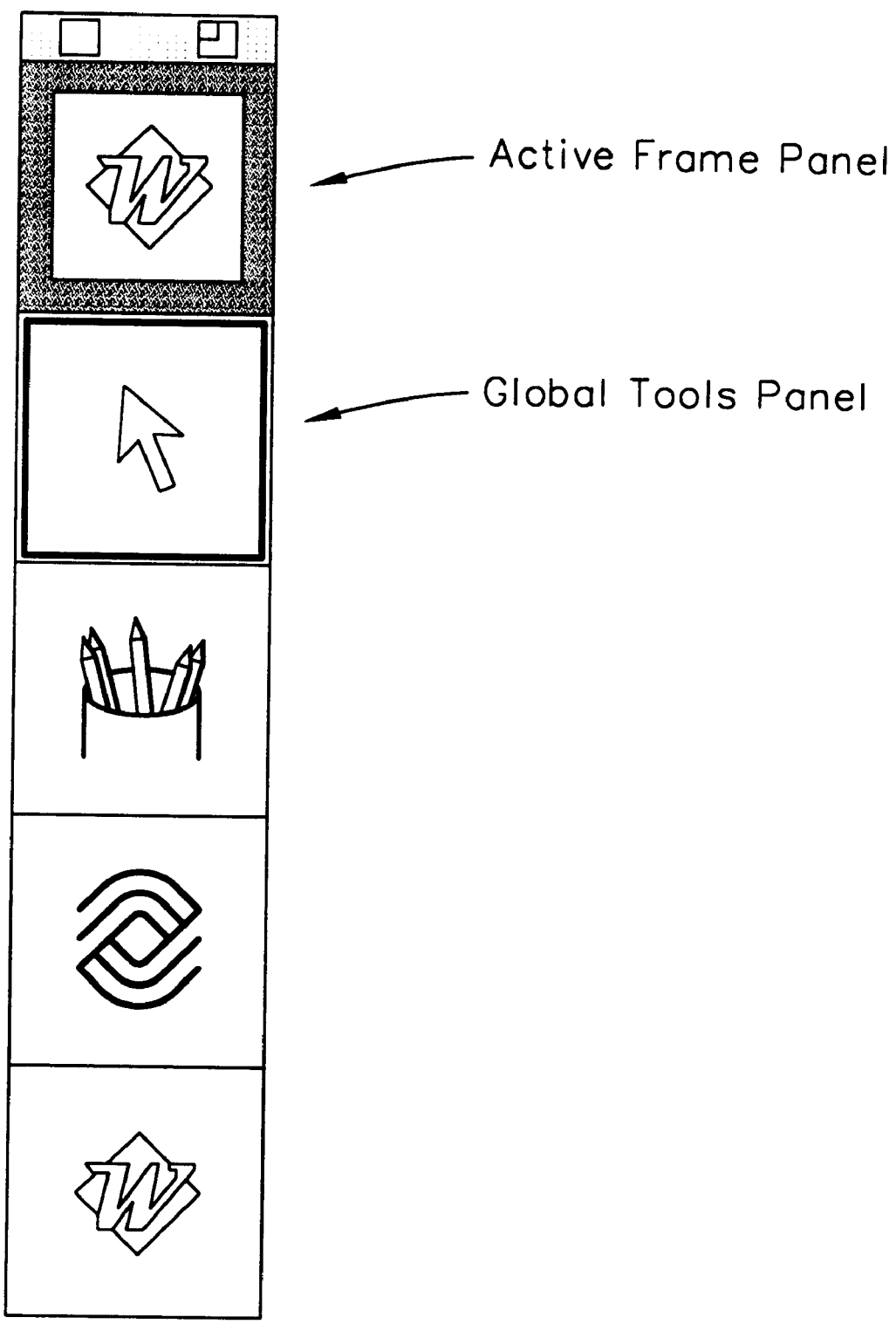
FIG. 4 illustrates an example of a command panel bar in accordance with a preferred embodiment.

Actions available to a user through command panels include the ability to click-drag an icon to pull out an associated command panel. Command panels may also be removed from the command panel bar and placed on the desktop. Single-clicking a command panel icon selects a default tool which is usually the frame creation tool. In the case of the select tool command panel, the default tool is the arrow selection tool. FIG. 4 illustrates an example of a command panel bar in accordance with a preferred embodiment.

Command Panel Container

Figure 5:
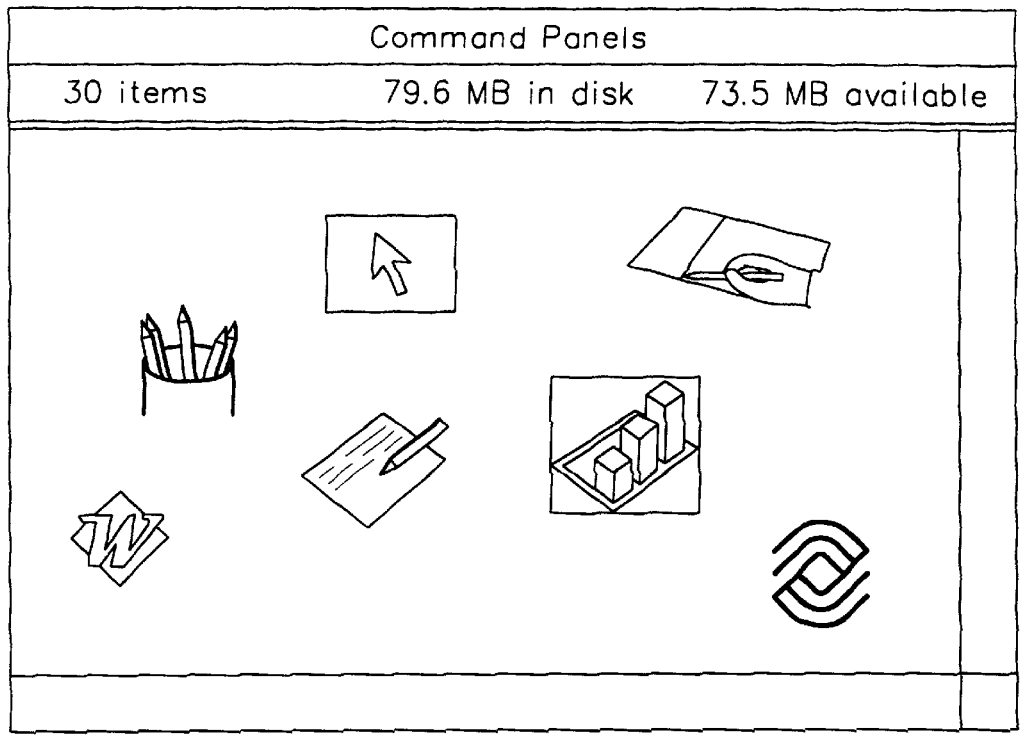
FIG. 5 illustrates an example of a command panel in accordance with a preferred embodiment.

When users install command panels, they are gathered into a global command panel container in the workspace. They can always access the panels in this container, or they can place them on various command panel bars. FIG. 5 illustrates an example of a command panel in accordance with a preferred embodiment.

Current Tool versus Active Tool

Figure 6:
FIG. 6 is an illustration of a tool cluster in accordance with a preferred embodiment.

Users set the current cursor tool by selecting it from within a tool cluster. FIG. 6 is an illustration of a tool cluster in accordance with a preferred embodiment. The current tool only becomes active when the user moves the cursor over a screen region in which the tool can function. Whenever the cursor is in a region inappropriate for the current tool, the active tool reverts to the selection tool and the cursor shape reverts to the arrow.

Active regions

Active regions are only within the active document. Anywhere outside of the active document, including the active document's furniture, the active tool becomes the selection arrow. Within the active document, the active regions depend on the current tool and the type of the frame under the cursor. Because of click-through, whether a frame is active or not is unimportant. As mentioned above, cursor tools come in three categories: creators, selectors, and selector effectors.

Creator's create new data, i.e. a circle drawing tool.

Selectors select existing data, i.e. Photoshop's Magic Wand.

Selector/Effectors select and change data, i.e. MacPaint's eraser tool.

Creator cursor tools are active above all frames that can embed. If a user draws a circle on a frame without a circle data type, the Tool Framework will create a new frame that does understand circles, place the circle in the new frame, and embed the new frame into the existing frame. This explicit frame creation allows users to create data where they need it, when they reed it, without having to first create the appropriate frame. Selector and Selector/Effector cursor tools are active only above frames of a type they understand. For example, the MacPaint eraser tool is only active above MacPaint frames. Above all other frames, the active tool becomes the selection arrow.

Figure 7:
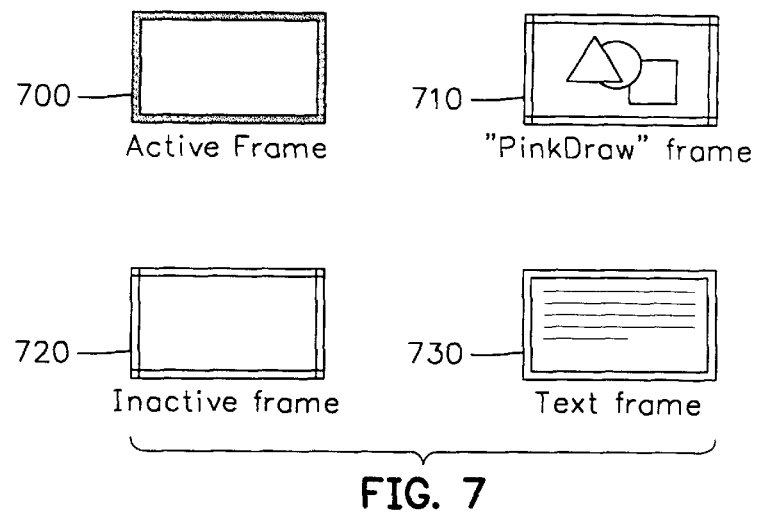
FIG. 7 illustrates some examples of various types of frames in accordance with a preferred embodiment.
Figure 9:
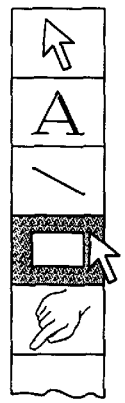
FIG. 9 illustrates a user selection of a rectangle cursor tool, a creator in accordance with a preferred embodiment.
Figure 10:
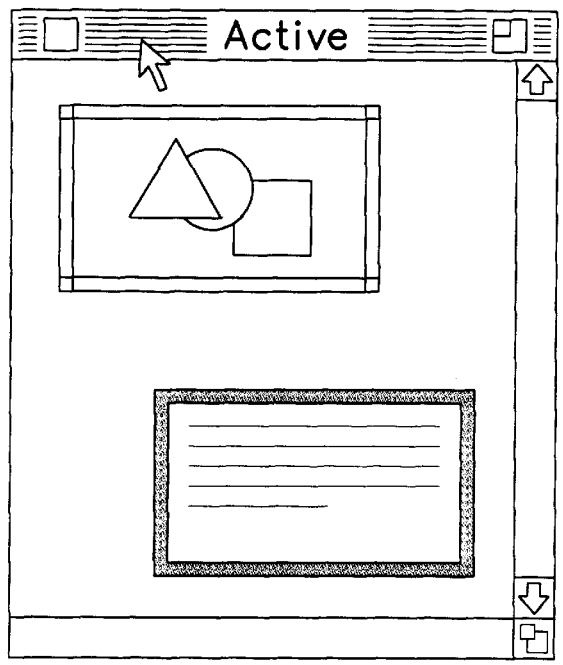
FIG. 10 illustrates the selection arrow in accordance with a preferred embodiment.
Figure 8:
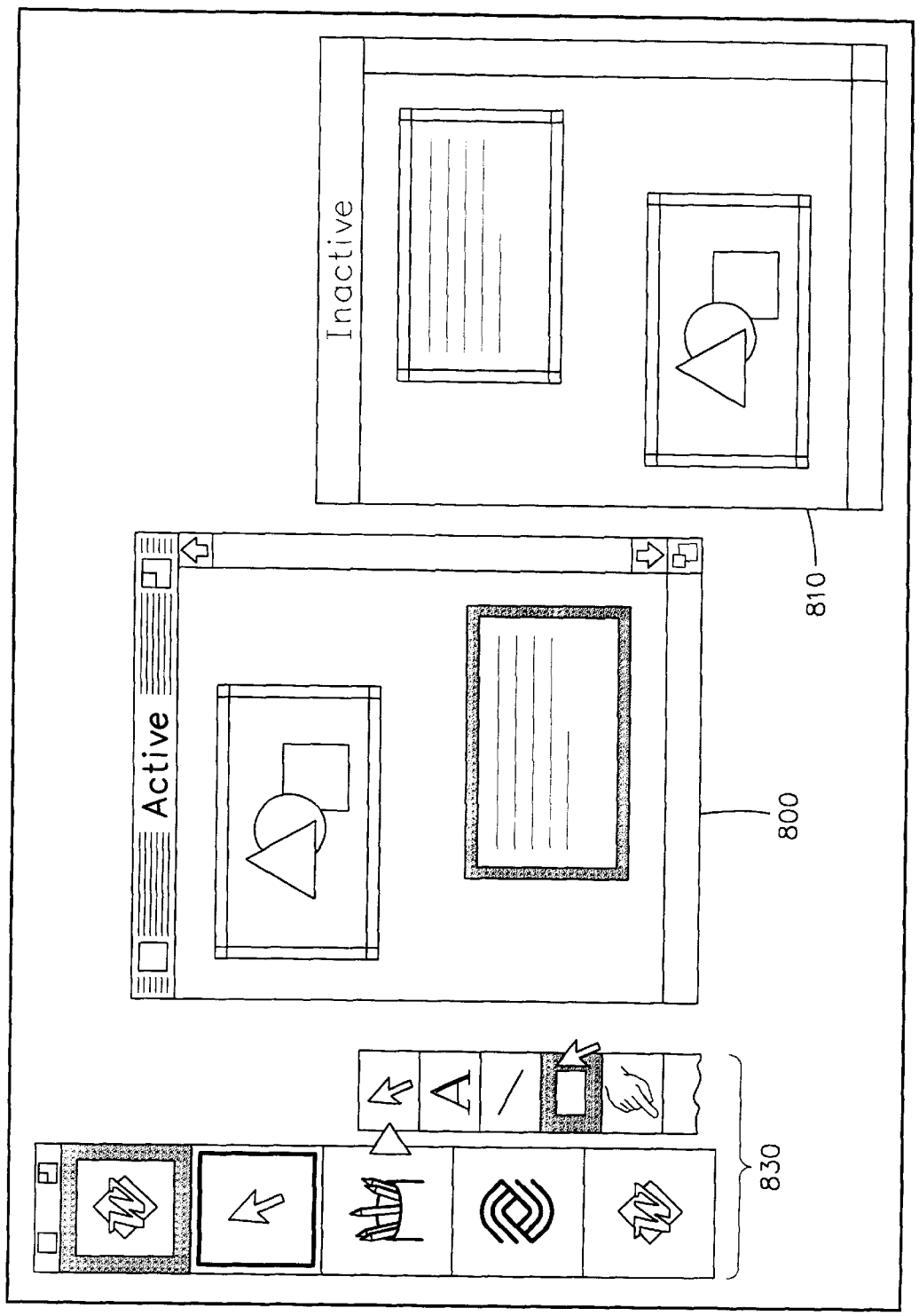
FIG. 8 illustrates a desktop with various frames in accordance with a preferred embodiment.
Figure 11:
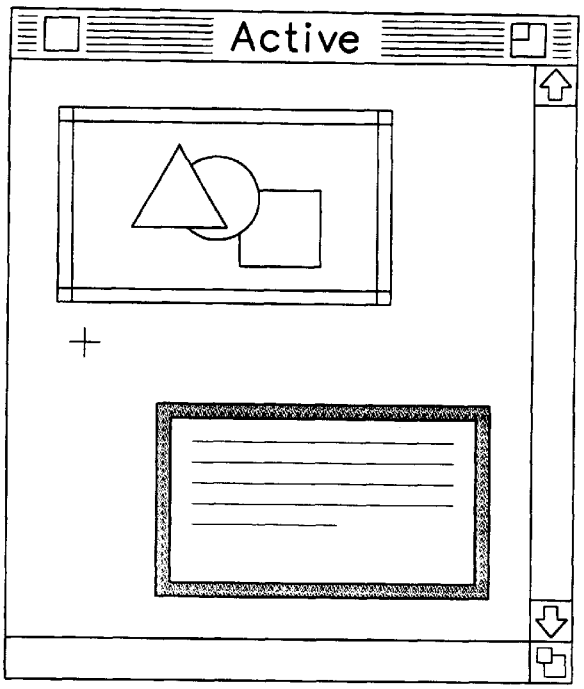
FIG. 11 illustrates the cursor rectangle tool becoming the active tool in accordance with a preferred embodiment.
Figure 12:
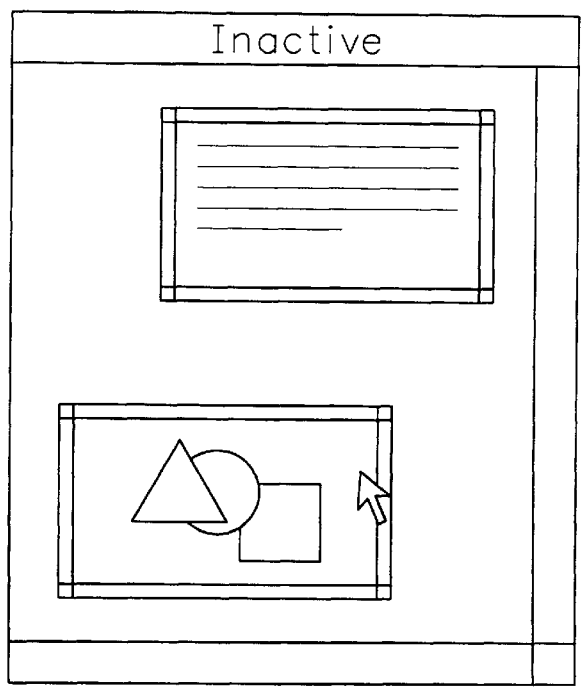
FIG. 12 illustrates the selection arrow passing over an inactive document, so the selection arrow becomes the active tool in accordance with a preferred embodiment.

FIG. 7 illustrates some examples of various types of frames in accordance with a preferred embodiment. An Active frame 700, Inactive frame 720, PinkDraw frame 710 and Text Frame 740 each have distinguishing characteristics. FIG. 8 illustrates a desktop with various frames in accordance with a preferred embodiment. In the Figure, a user has two documents open, one active 800, the other inactive 810. Both documents have two frames, one PinkDraw frame and one Text frame. The user is choosing tools from PinkDraw's command panel 830. FIG. 9 illustrates a user selection of a rectangle cursor tool, a creator in accordance with a preferred embodiment. Outside of the active document's content region (root-frame), the active tool is the selection arrow. FIG. 10 illustrates the selection arrow in accordance with a preferred embodiment. FIG. 11 illustrates the cursor rectangle tool becoming the active tool in accordance with a preferred embodiment. FIG. 12 illustrates the selection arrow passing over an inactive document, so the selection arrow becomes the active tool in accordance with a preferred embodiment.

Figure 14:
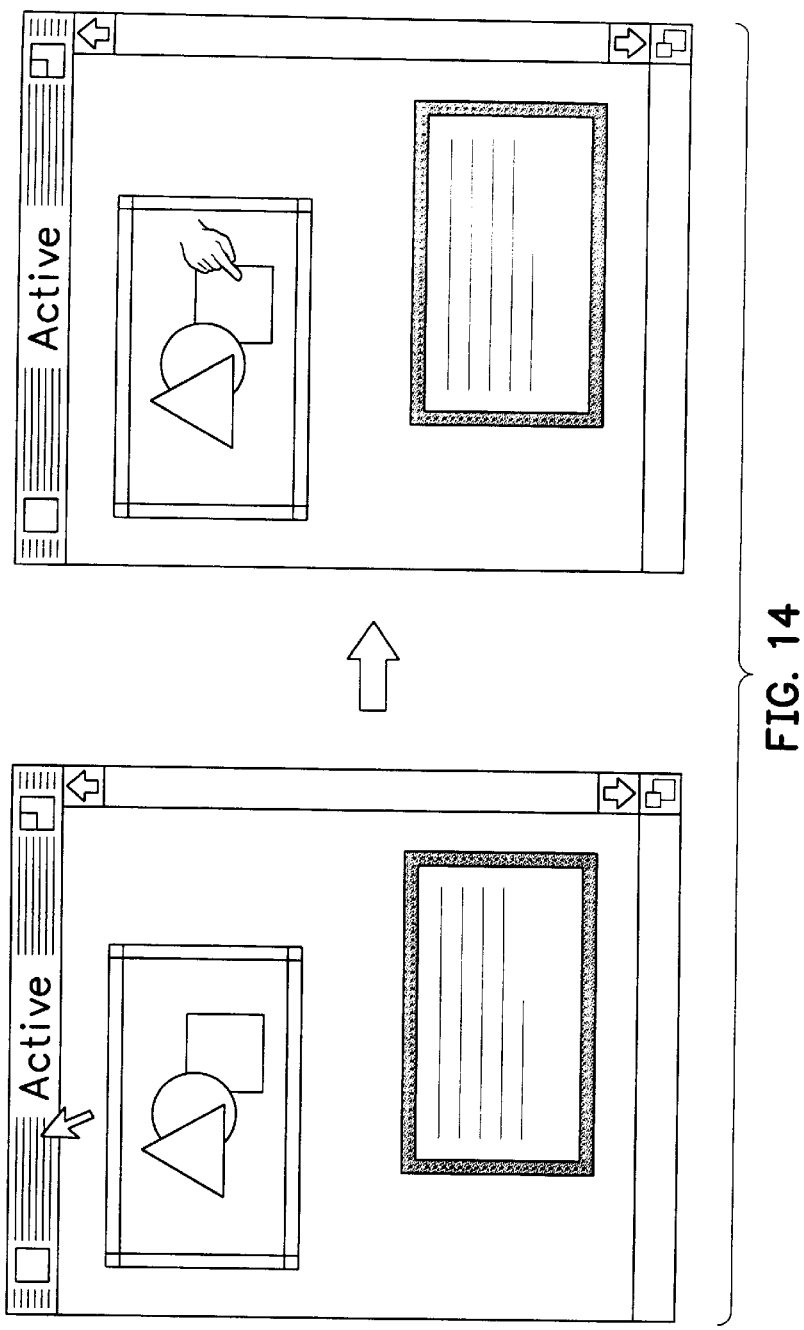
FIG. 14 illustrates enabling a smudge tool only when the cursor passes over a particular frame in accordance with a preferred embodiment.
Figure 13:
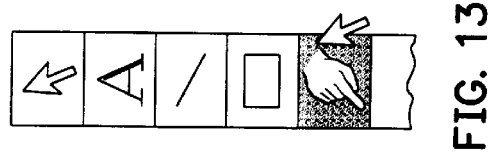
FIG. 13 illustrates the selection process for a smudge tool, a selector/effector, in accordance with a preferred embodiment.
Figure 15:
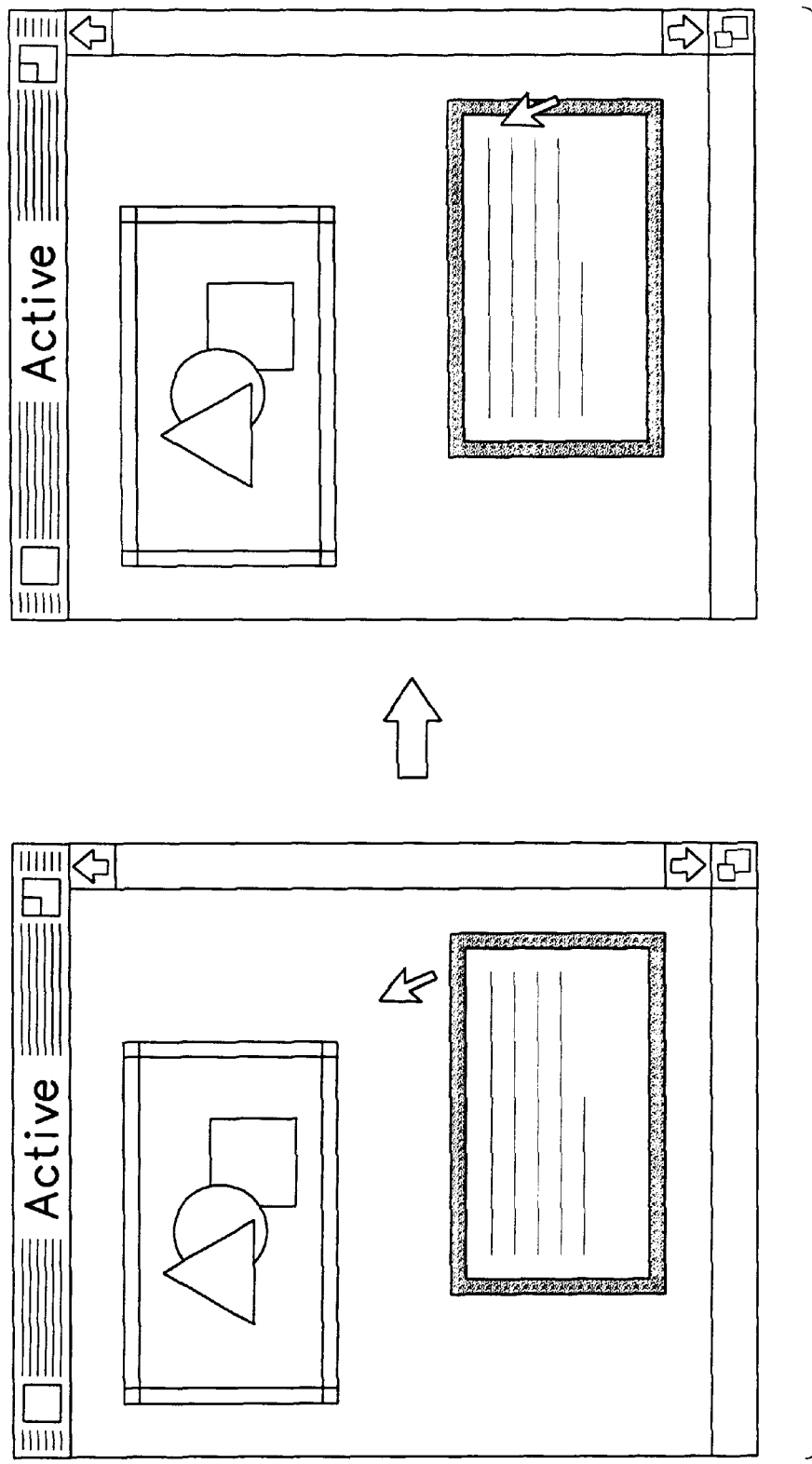
FIGS. 15 and 16 illustrate the dynamics of the tool cursor as it passes through a content region in accordance with a preferred embodiment.
Figures 16, 17:
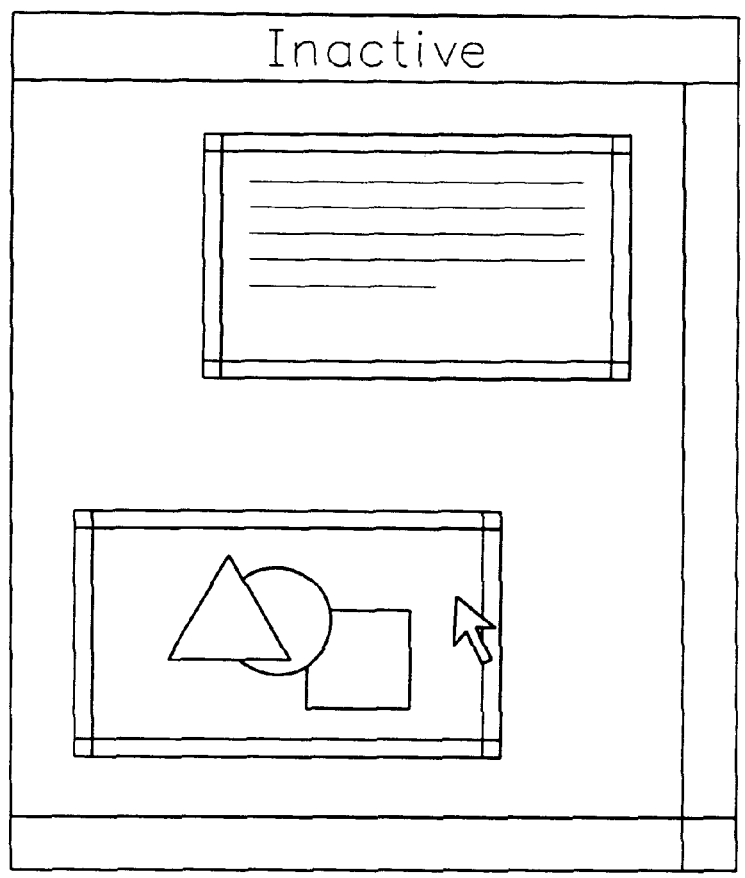
FIG. 17 summarizes the window and frame processing in accordance with a preferred embodiment.

FIG. 13 illustrates the selection process for a smudge tool, a selector/effector, in accordance with a preferred embodiment. FIG. 14 illustrates enabling a smudge tool only when the cursor passes over a particular frame in accordance with a preferred embodiment. FIGS. 15 and 16 illustrate the dynamics of the tool cursor as it passes through a content region in accordance with a preferred embodiment. As the cursor passes through a content region of the active document and other non-PinkDraw frames, the active tool becomes the selection tool.

Accessing/Retrieving Command Panels

There are several ways to access a command panel. Users can open a panel by doubleclicking its icon from within the global panel container or any other workspace container. For any panels that have been placed on the Panel Bar, users can simply select the panel's icon and retrieve it. When users select a frame, they can issue a "Show command panel" command, and the workspace will open the default command panel for the current frame's type. So, If I select a PinkDraw frame and choose "Show command panel", the workspace will open the PinkDraw command panel.

Multiple command panels per Frame Type

Some document types can be opened by several applications. For example Painter, MacPaint, Photoshop, MacDraw, and TeachText can all open PICT files. In accordance with a preferred embodiment, certain frame types, such as images and text, will have many different command panels. To choose among all the possible command panels when working with a particular frame, a frame's property sheet allows users to select a command panel and even set a default command panel for a particular frame's type. The "Show command panel" command opens a default command panel.

Frame and Window Activation

It is important to understand how windows and frames are activated, because tools other than the selection arrow are only active within the active window. When discussing activation, there are two issues to consider. First, when does the window or frame activate? Second, how does the initial click into an inactive frame or window affect the data?

Frames

Frames must activate on mouse-down because their activation feedback may be important to the action the user is initiating. For example, if the user clicks down on a frame with the rectangle cursor tool, the frame must activate to show its bounds so that the user can know where the rectangle will be clipped. The first click within an inactive frame not only causes activation, but because of click-through effects, the contents of the frame behave as if the frame had already been active. So, if the eraser cursor tool is selected and used to draw across an inactive frame, the first click detected will erase some data.

Window

Windows activate when a mouse-up event occurs within their bounds. The mouse-up can come after a click within the window's bounds or as the user releases the mouse button when dragging an object into the window. Because windows do not activate until mouse-up, the active tool will always be the selection arrow during a drag. If the current tool is something other than the selection arrow, it will become active only after the drag has been completed and the target window has activated. The first click within an inactive window cannot affect the contents of the window other than to select or drag them. It is important that the first click do nothing damaging so that users can't accidentally destroy data by swiping a selector/effector tool across the screen. But, by letting the first click select and drag data, drag-and-drop actions are accelerated. Since the window will not activate until mouse-up, an object can be selected from an inactive window and dragged into an active window without ever causing the inactive window to come to the front. FIG. 17 summarizes the window and frame processing in accordance with a preferred embodiment.

Tools Architecture Overview

The Cursor Tools framework provides a structure for developing cursor tools that can be used across frames and documents, and provides the necessary system services for transporting tools from tool selection controls (such as a tool cluster or palette) to the frames where they can effect user data. The framework manages the overall tool appearance and behavior by providing these system services. The following classes are the main classes that comprise the Cursor Tools framework:

- TTool—Base class for all cursor tools including TSimpleMouseTool and TDelegatingMouseTool. Additionally, provides static access methods for the ToolServer
- MTooltarget—A mixing class that provides selection targets for tools to work on
- MToolInteractor—Created by tools to respond to input and provide feedback while a selection is being made
- Commands—Created by tool interactors to modify tool targets
- TToolCommandlBinding—Binds a command to a target
- MToollHandler—Part of application that services needs of tools
- TToolNegotiator—Matches a tool to a particular event such as a mouse click
- TToolServer—Stores and provides access to tools for multiple applications across multiple address spaces.

Cursor tools offer a way to decouple direct manipulation and interactive feedback from the rest of an application. As a result, developers can implement tools that will work on other developer's applications. Having two formal roles (that of a tool and that of a tool handler) is also a bent fit within a single application since it reduces the impact of modifying the code.

Applications in a document explicitly support cursor tools by dispatching positionally targeted events, e.g. mouse events, to a tool negotiator. This is done on a view-by-view basis so an application could contain multiple views, some of which support cursor tools and others that do not. Each view also designates a tool handler, which is an object that answers requests of the tools framework. Typically, the view is also its own tool handler by mixing in MToolHandler.

The cursor tools framework handles events that are dispatched to it from an application by (1) identifying the current tool, (2) determining if the tool will work with the event, and (3) determining if the application can support the current tool. We can think of this process as the current tool attempting to work in a view of the application.

Tools work on targets. Each tool (1) specifies the type of target that it supports and (2) relies on the interface of that target class. When a tool attempts to work at a specific location in a view of an application that supports tools, the cursor tools framework asks the application's tool handler to create a target of the type that the tool wants and corresponding to the location of the tool. If the application can, it creates and returns a target for the tool to work on. If the application can create an acceptable target, then the cursor tools framework invokes the tool. The tool creates and starts a tool interactor, which creates, binds, and executes a command against the target. By changing the target the tool changes application data.

Setting and Distributing the Current Tool

Three objects work in concert to set and distribute the current tool. They are the TCursorToolSelectionState, the ToolServer, and the TTool.

TCursorToolSelectionState and SetCurrentToolCmd

When executed, the SetCurrentToolCmd takes a given Tool and sends it to the ToolServer. The SetCurrentToolCmd is designed to be used in places where Redo/Undo or collaboration capabilities are desirable. Since all commands have this functionality, it comes for free.

The most common method developers utilize to set a current tool is via a control such as a menu item or a button in a tool cluster or palette. To facilitate this processing, the cursor tool framework provides a CursorToolSelectionState class which is a momentary control state subclass. It is sonstructed using a Tool, which it adopts. It is then passed to the constructor of any momentary control. An example of this is as follows:

```
TTool* tool = new TMyTool;
TMomentaryMenuItem * menu = new TMomentaryMenuItem (
    new TCursorToolSelectionState (tool) );
```

The CursorToolSelectionState calls the static data method TTool::SetCurrentTool with the adopted tool when the momentary control is selected. The tool is then sent to the ToolServer, similar to the SetCurrentToolCmd.

ToolServer

The ToolServer's job is to associate Tools with Cursors. When the TTool::SetCurrentTool method sends a Tool to the tool server, the server keeps track of the tool as the current tool for the given cursor. Later, when an MToolHandler (usually a frame or view) asks the current tool for a given cursor, the ToolServer returns the appropriate tool to the requesting view. Note that it is necessary for the tool server to keep track of more than one cursor since multiple input devices may be in use at any given time.

Figure 18:
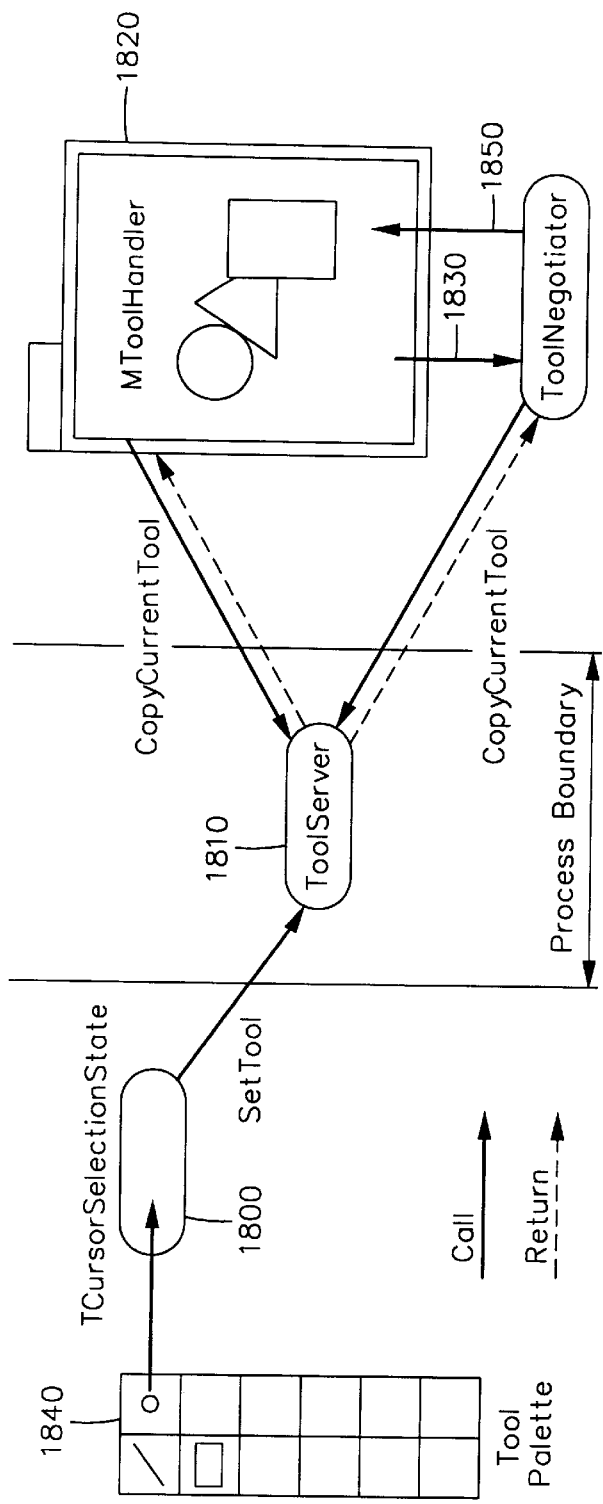
FIG. 18 is a flow diagram showing the logic of tool processing in accordance with a preferred embodiment.

The more detailed process for setting and using tools globally (via the tool server) is indicated by the Flow Diagram description and FIG. 18 on the following pages.

Sequence of Calls on MouseDown

In a many-cursor environment the view cannot be sure that the cursor that was active when the mouse button was pressed is the same as the cursor that most recently entered the bounds of the view, so it must again request the current tool associated with the cursor that moused down. The server returns the current tool and the tool negotiator dispatches the event to the appropriate event handling mechanism. In the case of a delegating mouse tool, this event handling mechanism is provided by the view targeted by the mouse click. In the case of a standard mouse tool, this event handling mechanism is provided by the tool itself. It is at this point that a ToolInteractor is started. The interactor takes over and proceeds to run the user interaction.

Flow Diagram

FIG. 18 is a flow diagram showing the logic of tool processing in accordance with a preferred embodiment. Processing commences at 1800 where a tool palette 1840 has detected the selection of a particular tool. At 1800, the current tool is activated by sending the information associated with the selected tool to the ToolServer 1810 via the TTool::SetTool static data method. Trool::SetTool sends the tool information to the ToolServer 1810 by calling the TToolServerCaler::SetTool method, which flattens the tool into a stream of bits and transports it to the server. On the ToolServer side, the bits are streamed back in and stored as the current tool.

The ToolServer 1810, in turn is called by the event handling mechanisms in the frame 1820. This would occur either when the cursor entered the region of the frame so the frame could change the graphic of the cursor, or when the user made some interaction on the frame such as pressing the mouse button. By mousing down inside the frame, the frame's DistributePositionalEvent method is called which creates a TToolNegotiator and passes the event at 1830. The TToolNegotiator requests the current tool from the ToolServer and matches the event with the tool. The tool handler (MToolHandler subclass) that is identified (that of the frame) is either asked for a target for the tool to work on in which case the Tool provides its own interactor to work with that target. Or, in the case of a delegating tool, the tool handler is asked to provide its own interactor. Thus it manages the relationship between its own interactor and the target(s) of the tool. An interactor is an object created in response to a user's mouse action to handle the event associated with the mouse action. An interactor often results in the creation of a command object once the system has determined the particular event associated with the mouse action.

When the ToolServer is queried for the current tool by either the frame or a ToolNegotiator, the ToolServer 1810 streams back the bits representing the current TTool. This information is then resurrected into an object of the appropriate TTool subclass type.

TTool

Figure 19:
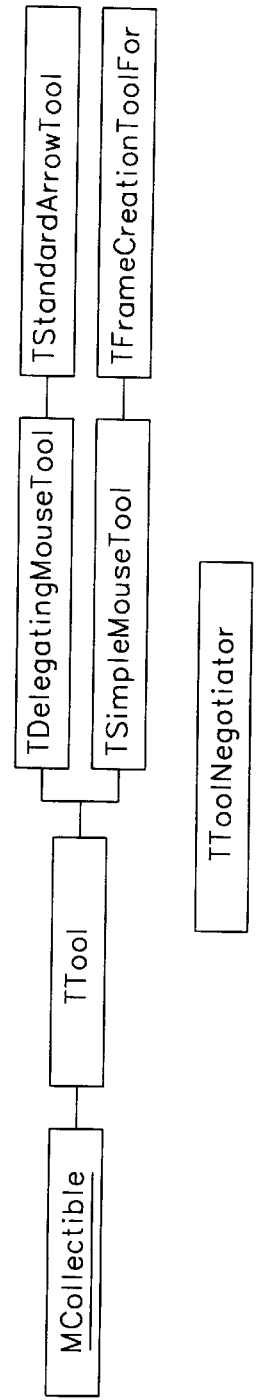
FIG. 19 is a diagram showing the class hierarchy in accordance with a preferred embodiment.

FIG. 19 is a diagram showing the class hierarchy in accordance with a preferred embodiment. Of particular interest are, TGlobalID GetID( ) const; which gets the tools ID; and virtual void SetID(TGlobalID); which sets the tool's ID. The cursor tools framework uses a tool's global ID to uniquely identify it within the tool server and to provide appropriate tool changed notification to tool setting commands. For more information on the detailed processing associated with notification processing reference can be made to U.S. Pat. No. 5,315,703 to Taligent, Inc.

TTool is a base class for defining tools. It has several static methods for communicating with the tool server. Trool subclasses provide graphics and a text name for menus and tool palettes, a cursor graphic to represent the tool when active, a list of selection types for which the tool is valid, and it creates an interactor subclass that is activated when the user presses a mouse button in a valid frame with the tool selected. The object that performs the actual work of creating or modifying data in a frame is the interactor.

| virtual | MGraphic* | CreatePaletteGraphic( ) const; |
|---|---|---|

Subclasses must return a new MGraphic to be used on a tool palette or a menu.

| virtual | void | GetPaletteText(TText&) const; |
|---|---|---|

Subclasses must set the TText's text to a string appropriate for a menu item representing the tool.

| virtual | MGraphic* | CreateCursorGraphic( ) const; |
|---|---|---|

Subclasses must return a new MGraphic to be used as the cursor when the tool is active.

TTool Static Methods For Accessing The Tool Server

| static void | SetCurrentTool(const TTool& theTool); |
|---|---|

Sets "the tool" as the current tool.

| static TTool* | CopyCurrentTool( ); |
|---|---|

Returns a copy of the current tool.

Tool Static Methods For Creating Notification Interests

| static TInterest* | CreateCurrentToolChangedInterest( ); |
|---|---|

Returns an interest used to receive notification each time the current tool changes.

| static TInterest* | CreateCurrentToolTypeChangedInterest( ); |
|---|---|

Returns an interest used to receive notification each time the current tool changes to a tool of a different class.

MToolhandler

MToolHandler is mixed in to the portion(s) of an application that are responsible for supporting the tools framework. Typically this would be the view(s) that support tools.

MToolHandler Pure Virtual Methods virtual void AdoptAndDo (TToolCormandBinding*)=0;
virtual void DoBegin (TToolCornmandBinding&)=0;
virtual void DoIncrement (TToolCommandBinding&)=0;
virtual void AdoptAndDoEnd (TToolCommandBinding*)= 0;

These four methods should be overridden to process TToolCommandBindings (and execute the commands associated with them). This protocol is utilized by the TToolInteractor.

MToolHandler Virtual Methods virtual MToolTarget* CreateToolTarget (const TTypeDescription&, const TGPoint&);
Override CreateToolTarget to provide targets for tools to work on. The tools framework specifies the location within a frame that the tool should start its interaction, and it specifies the type of target that it requires (such as an MGraphic). From this information, any appropriate targets at that location would be supplied.
virtual TToolInteractor* CreateToolInteractor (const TGPoint&, const TToken& hint);
Override CreateToolInteractor to create interactors for the tool framework to start. The tools framework calls CreateToolInteractor when a delegating tool must work on a view as the result of a user mousing down in a valid frame. A delegating tool is a tool that has polymorphic behavior across applications and is target-type neutral, such as the arrow tool. Polymorphic behavior refers to the object-oriented mechanism by which objects of different classes related by inheritance respond uniquely to the same member function call.
virtual Boolean SupportsFeedback ( ) const;
virtual void AdoptFeedbackGraphic (MGraphic*, const TGArea& total, const TGArea& changed);
virtual MGraphic* OrphanFeedbackGraphic (Boolean repair=TRUE);
These three feedback methods provide simple feedback mechanisms that are used by tool interactors. The tool handler subclassers can override the methods to provide more complicated feedback during tool interaction.

TSimpleMouseTool

A simple 1Tool subclass that uses a mouse down event to create and start an interactor. TSimpleMouseTool starts its own interactor which is supplied by a subclass that overrides the following CreateInteractor pure virtual method:
virtual TroolInteractor* CreateInteractor( )=0;

TDelegatignMouseTool

A simple TTool subclass that starts an application supplied interaction upon receiving a mouse down event. When a mouse down event is received, the delegating mouse tool asks the tool handler to provide a tool interactor which is then started by the delegating mouse tool.

TStandardArrowTool

A simple TDelegatingMouseTool subclass with the following attributes:
Palette Graphic: The standard Pink Arrow.
Cursor Graphic: The standard Pink Arrow.
Palette Text: "Arrow".
Tool Interactor: The interactor is supplied as needed by the application that the tool is used on, as with all TDelegatingMouseTools.

TToolNegotiator

An event handler (usually a view) creates a negotiator and dispatches the current event to it. The negotiator interfaces with the cursor tools framework to match a tool with the event. If successful, the tools framework will call back the tool handler that is identified to request either a target for the tool to work on (in the case of a simple mouse tool) or an interactor (in the case of a delegating tool).

TToolInteractor

TToolInteractor subclasses from TInteractor and is the base class for all tool interactors. The following four methods were implemented to facilitate the appropriate interactions (such as feedback) that result from a mouse down event in an appropriate tool handling frame.

CALLER/DISPATCHER CLASSES

TToolServer

Figure 20:
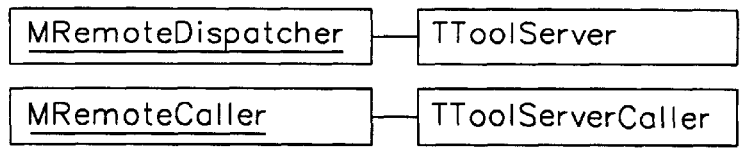
FIG. 20 is a TToolServer class diagram in accordance with a preferred embodiment.

TToolServer is a dispatcher class that implements the tool server. FIG. 20 is a TToolServer class diagram in accordance with a preferred embodiment.

TToolServerCaller

TToolServer Caller is the dispatcher class used by TTool to communicate with the tool server. You should never have to instantiate one of these or speak to one directly.

Figure 21:
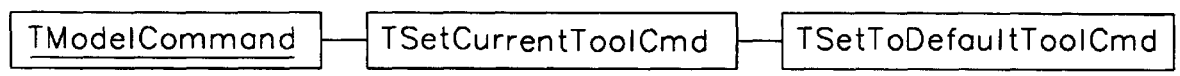
FIG. 21 illustrates the command classes in accordance with a preferred embodiment.

COMMAND CLASSES
TSetCurrentToolCmd
Sets the current tool in the tool server to its bound tool. FIG. 21 illustrates the command classes in accordance with a preferred embodiment.
TSetCurrentToolCmd(const TTool& the tool);
Constructs a command with the tool as its bound tool.

| void | SetTool(const TTool& theTool); |
|---|---|

Sets the tool as the commands bound tool. The command discards its old tool, if it had one.

| Boolean | GetSelected( ); |
|---|---|

Returns whether the commands bound tool is the current tool (i.e. whether a control holding this command should show itself as selected).

| void | SetSelected(Boolean); |
|---|---|

Can be used as a controls CommandBooleanSetter, but it really does nothing. The command sets its selected state based solely on notification from the tool server.
TInterest* CreateSelectionStateChangedInterest( ) const;
Use this interest to receive notification when the selected state of a particular command changes. The command uses this interest when a control calls TSetCurrentToolCmd::ConnectData( ).

TSetToDefaultToolCmd
Sets the current tool to the default tool.

CURSOR GRAPHICS

Figure 22:
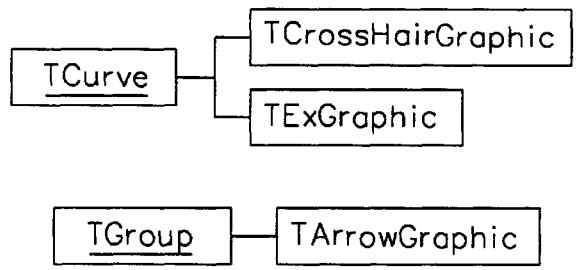
FIG. 22 illustrates some of the pre-built geometries in accordance with a preferred embodiment.

MGraphic subclasses with pre-built geometries. FIG. 22 illustrates some of the pre-built geometries.

TCrossHairGraphic
A draw program style cross hair +
TExGraphic
A big pink X, used for debugging ✕
TArrowGraphic
                An arrow ↖

Figure 23:
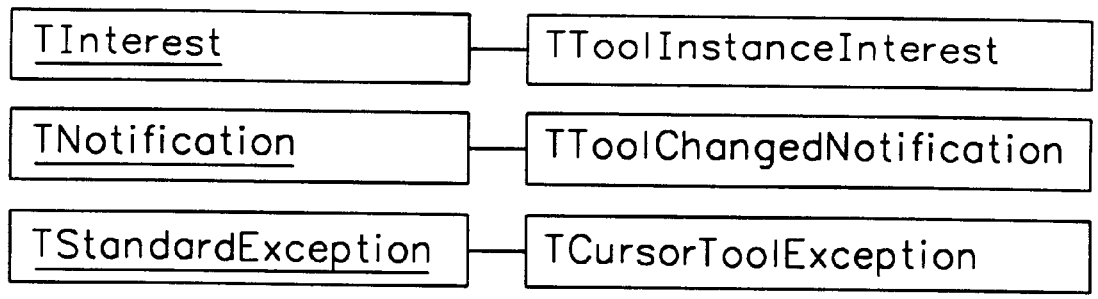
FIG. 23 illustrates the utility classes in accordance with a preferred embodiment.

UTILITY CLASSES
TToolInstanceInterest
This object is constructed with a TTool. It expresses an instance of a TTool becoming the current tool. FIG. 23 illustrates the utility classes in accordance with a preferred embodiment.
TToolInstanceInterest(const TTool&, MNotifier*, const TToken&);
TToolChangedNotification
The Tool Server throws TToolChangedNotification every time the current tool changes.
TCursorToolException
The exception subclass thrown by the Cursor Tool framework.
Errors defined by TCursorToolException:
kNoBoundCursor=0x1D02
TSetCurrentToolCmd::Do( )called with no bound cursor. This exception is currently not used. It will be thrown when the cursor server supports multiple cursors. At that time, programmers will need to bind both a tool and a cursor to the command before issuing it.
kNoBoundToolInCommand=0x1D02
Thrown when trying to call a method on TSetCurrentTool-Cmd that requires a bound tool when the command has no bound tool.
kNoBoundTooLInServer=0x1D03
Thrown when trying to call a method on TToolServer that requires a current tool before a current tool has been set.

Figure 24:
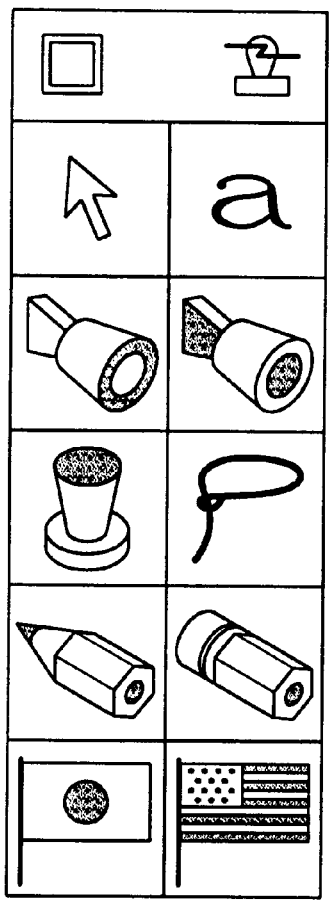
FIG. 24 is another illustration of a tool cluster in accordance with a preferred embodiment.

A C++ listing in accordance with a preferred embodiment is presented below. The code is used to create the tool cluster presented on a display and captured in FIG. 24.

-22-

```
//------------------------------------------------
//        Main
//------------------------------------------------
void main(int argc, char **argv)
{
 TRequestQueue queue;
 TRequestHandler rh (&queue);

//--------- The palette window --------------------------
```

-23-

```
         TStandardWindow *palette =
                 new TStandardWindow(   TStandardText("Text Tools"),
                                        TRUE,  // hasCloseBox
                                        FALSE, // hasZoomBox
  5                                     TRUE,  // hasMinimizer
                                        FALSE); // isResizable TTextPaletteView* paletteView = new TTextPaletteView();
         TGPoint size = paletteView->GetAllocatedArea().GetSize();
 10
         palette->AdoptContentView(paletteView);

TGPoint pos2(100,80);
         palette->TranslateAllocatedAreaInParentTo(pos2);
 15
         TGPoint windowSize = palette->ContentToWindow(size);
         windowSize.fY -= 14;
         palette->SetWindowSize(windowSize);

20      TViewRoot *vr = new TViewRoot(&queue);
         vr->AdoptChild(palette);

palette->Open();
         palette->Enable();
 25
         while (palette->IsOpen()) {
                 rh.WaitAndDispatchNextRequest();
         }
         delete vr;
 30   }

//---------TTextPaletteView----------------------
 35   class TTextPaletteView : public TSimpleView
      {
      public:
                 MCollectibleDeclarationsMacro(TTextPaletteView);

40                                     TTextPaletteView();
                                            TTextPaletteView(const TTextPaletteView& copy);
                 virtual                 ~TTextPaletteView();

virtual TStream&        operator>>=(TStream& output) const;
 45              virtual TStream&        operator<<=(TStream& input);

// Initialization
                 virtual void            Initialize();

50              // TView virtuals
                 virtual void            GetBounds( TGArea& ) const;
                         virtual void    DrawContents(TGrafPort& port) const;

private:
 55
                 void                    LayoutNext(TView *control);
```

```
        enum { kOriginalVersion };
        TGPoint                 fSize;
        TGPoint                 fNextPos;
                TModifiableImage*       fBackground;
    };

//============ implementation ================

//------------------ TRedHighlighterState ----------------
class TRedHighlighterState : public MMomentaryControlState
{
public:
 TRedHighlighterState()
    {
    } virtual void Select()
    {
            TRGBColor* highlightColor = new TRGBColor(1,.5,.5);
            TTool* myTool = new THighlightTextTool(highlightColor);
            TTool::SetCurrentTool ( *myTool );
    }
};
//------------------------ TApprovalState ----------------
class TApprovalState : public MMomentaryControlState
{
public:
 TApprovalState()
    {
    } virtual void Select()
    {
            TTool::SetCurrentTool ( TStandardArrowTool() );
    }
};

//---------------------- TEraserState ----------------
class TEraserState : public MMomentaryControlState
{
public:
 TEraserState()
    {
    } virtual void Select()
    {
```

-25-

```
                TRGBColor* highlightColor = new TRGBColor(1,.5,.5);
                TTool* myTool =
                        new TStandardTextTool(new TReplaceTextCommand(),
                                              NIL,
 5                                            CreateEraserCursorGraphic());
                                              TTool::SetCurrentTool ( *myTool );
        }

MGraphic* CreateEraserCursorGraphic( )
10      {
                TGIFConverter   converter;
                TModifiableImage* eraserImage(NIL);
                try
                {
15                      TFileSegment aFile("Eraser.GIF", 0, 0, kOpen, kPrivate, kReadOnly,
    kNotMemoryResident);
                        eraserImage = converter.CreateFrom(aFile);
                }
                catch (TGIFConverter::TGIFConverterException)
20              {
                        qprintf("GIF converter error\n");
                } return eraserImage;
25      }

};

30      //---------------------- TZeroState ----------------------
        class TZeroState : public MMomentaryControlState
        {
        public:
          TZeroState()
35        {
          } virtual void Select()
40        {
                TRGBColor* highlightColor = new TRGBColor(1,.5,.5);
                TTool* myTool = new TTranslateDateTool(highlightColor, FALSE);
                TTool::SetCurrentTool ( *myTool );
          }
45      };

//---------------------- TUSState ----------------------
        class TUSState : public MMomentaryControlState
        {
50      public:
          TUSState()
          {
          }

55
          virtual void Select()
```

-26-

```
        {
                TRGBColor* highlightColor = new TRGBColor(.5,.5,1);
                TTool* myTool = new TTranslateDateTool(highlightColor, TRUE);
                TTool::SetCurrentTool ( *myTool );
        }
};

//------------------------ TRedHighlighterState ------------------------
class TYellowHighlighterState : public MMomentaryControlState
{
public:
TYellowHighlighterState()
        {
        } virtual void Select()
        {
                TRGBColor* highlightColor = new TRGBColor(1,1,0);
                TTool* myTool = new THighlightTextTool(highlightColor);
                TTool::SetCurrentTool ( *myTool );
        }
};

//------------------------ TStandardArrowState ------------------------
class TStandardArrowState : public MMomentaryControlState
{
public:
TStandardArrowState()
        {
        } virtual void Select()
        {
                TTool::SetCurrentTool ( TStandardArrowTool() );
        }
};

//------------------------ TStandardArrowState ------------------------
class TIBeamState : public MMomentaryControlState
{
public:
TIBeamState()
        {
        } virtual void Select()
        {
                TTool::SetCurrentTool ( TStandardIBeamTool() );
        }
};

//------------------------ TTextPaletteView ------------------------
MCollectibleDefinitionsMacro(TTextPaletteView, kOriginalVersion);
```

-27-

```
    TTextPaletteView::TTextPaletteView()
    :  TSimpleView(),
       fBackground(NIL),
5      VViewInitialize(&gMetaInfo)
    {
      CheckForInitialize(&gMetaInfo);
    }

10
    TTextPaletteView::TTextPaletteView (const TTextPaletteView& copy) :
       TSimpleView(copy),
       fBackground(NIL),
       VViewInitialize(&gMetaInfo)
15  {
      CheckForInitialize(&gMetaInfo);
    }

20  TTextPaletteView::~TTextPaletteView ()
    {
      CheckForFinalize(&gMetaInfo);
    }

25  TStream&
    TTextPaletteView::operator>>= (TStream& output)    const
    {
       WriteVersion(output);
       TSimpleView::operator>>=(output);
30     return output;
    }

TStream&
    TTextPaletteView::operator<<= (TStream& input)
35  {
       VersionInfo version = ReadVersion(input);
       TSimpleView::operator<<=(input);
       switch(version)
       {
40       case kOriginalVersion:
             break;
          default:
                   throw TInvalidVersionError();
       }
45     return input;
    } static const GCoordinate kGap = 2;

50  void
    TTextPaletteView::LayoutNext(TView *control)
    {
    control->TranslateAllocatedAreaInParentTo(fNextPos);

55   if (fNextPos.fX <= 1)
       {
```

-28-

```
                    fNextPos.fX = 35; // over
            }
            else
            {
                    fNextPos.fX = 1;
                    fNextPos.fY += 35; // down
            }
    }
    void
    TTextPaletteView::Initialize ()
    {
        TSimpleView::Initialize();

TColorPaint *fillPaint = TUIConfiguration::GetUIConfiguration()-
>CreatePrimaryFillPaint(GetBundle());
            AdoptBundle(new TGrafBundle(fillPaint, TAttributeState::kFill));
            short desiredWidth = 27;
            short desiredHeight = 27;
            fNextPos = TGPoint(1,27);
            {
                    // Creating arrow tool
                    TTextLabel* theLabel = new TTextLabel(TStandardText(""),
                            TFontIdentifierStyle(TToken("Chicago")),
                            TFontPointSizeStyle(12), TTextColorStyle::GetBlack());

TGIFConverter  converter;
                    TGraphicLabel* buttonImage(NIL);
                    try
                    {
                            TFileSegment aFile("Cursor.GIF", 0, 0, kOpen, kPrivate, kReadOnly,
kNotMemoryResident);
                            buttonImage = new TGraphicLabel(converter.CreateFrom(aFile));
                    }
                    catch (TGIFConverter::TGIFConverterException)
                    {
                            qprintf("GIF converter error.");
                    }

TPushButton * button = new TPushButton(new TStandardArrowState(), theLabel,
buttonImage);
                    AdoptChild( button );
                    LayoutNext(button);
            }

// Push button - "A" tool
            {
                    TTextLabel* theLabel = new TTextLabel(TStandardText(""),
                            TFontIdentifierStyle(TToken("Chicago")),
                            TFontPointSizeStyle(12), TTextColorStyle::GetBlack());
                    TGIFConverter  converter;
                    TGraphicLabel* buttonImage(NIL);
                    try
                    {
                            TFileSegment aFile("A.GIF", 0, 0, kOpen, kPrivate, kReadOnly,
kNotMemoryResident);
```

```
                        buttonImage = new TGraphicLabel(converter.CreateFrom(aFile));
                }
                catch (TGIFConverter::TGIFConverterException)
                {
                        qprintf("GIF converter error.\n");
                }

TPushButton * button = new TPushButton(new TIBeamState(), theLabel, buttonImage);
                AdoptChild( button );
                LayoutNext(button);
        }

// Push button - yellow highlighter tool
        {
                TTextLabel* theLabel = new TTextLabel(TStandardText(""),
                                TFontIdentifierStyle(TToken("Chicago")),
                                TFontPointSizeStyle(12), TTextColorStyle::GetBlack());

TRGBColor* highlightColor = new TRGBColor(1,1,0);
                TTool* tempArrow = new THighlightTextTool(highlightColor);
                TGIFConverter   converter;
                TGraphicLabel*  buttonImage(NIL);
                try
                {
                        TFileSegment aFile("YellowPen.GIF", 0, 0, kOpen, kPrivate, kReadOnly, kNotMemoryResident);
                        buttonImage = new TGraphicLabel(converter.CreateFrom(aFile));
                }
                catch (TGIFConverter::TGIFConverterException)
                {
                        qprintf("GIF converter error.\n");
                }

TPushButton * button = new TPushButton(new TYellowHighlighterState(), theLabel, buttonImage);
                AdoptChild( button );
                LayoutNext(button);
                delete tempArrow;
        }

// Push button - red highlighter tool
        {
                ::qprintf("Creating red highlighter tool\n");
                TTextLabel* theLabel = new TTextLabel(TStandardText(""),
                                TFontIdentifierStyle(TToken("Chicago")),
                                TFontPointSizeStyle(12), TTextColorStyle::GetBlack());
                TRGBColor* highlightColor = new TRGBColor(1,0,0);
                TTool* tempArrow = new THighlightTextTool(highlightColor);
                TGIFConverter   converter;
                TGraphicLabel*  buttonImage(NIL);
                try
                {
                        TFileSegment aFile("RedPen.GIF", 0, 0, kOpen, kPrivate, kReadOnly, kNotMemoryResident);
                        buttonImage = new TGraphicLabel(converter.CreateFrom(aFile));
                }
```

-30-

```
          catch (TGIFConverter::TGIFConverterException)
          {
                  qprintf("GIF converter error.\n");
          }

TPushButton * button = new TPushButton(new TRedHighlighterState(), theLabel,
buttonImage);
          AdoptChild( button );
          LayoutNext(button);
          delete tempArrow;
     }

// Push button - approval stamp tool
     {
          TTextLabel* theLabel = new TTextLabel(TStandardText(""),
                       TFontIdentifierStyle(TToken("Chicago")),
                       TFontPointSizeStyle(12), TTextColorStyle::GetBlack());
          TGIFConverter  converter;
          TGraphicLabel*  buttonImage(NIL);
          try
          {
                  TFileSegment aFile("Approval.GIF", 0, 0, kOpen, kPrivate, kReadOnly,
kNotMemoryResident);
                  buttonImage = new TGraphicLabel(converter.CreateFrom(aFile));
          }
          catch (TGIFConverter::TGIFConverterException)
          {
                  qprintf("GIF converter error. \n");
          }

TPushButton * button = new TPushButton(new TApprovalState(), theLabel,
buttonImage);
          AdoptChild( button );
          LayoutNext(button);
     }

// Push button - lasso tool
     {
          TTextLabel* theLabel = new TTextLabel(TStandardText(""),
                       TFontIdentifierStyle(TToken("Chicago")),
                       TFontPointSizeStyle(12), TTextColorStyle::GetBlack());
          TGIFConverter  converter;
          TGraphicLabel*  buttonImage(NIL);
          try
          {
                  TFileSegment aFile("Lasso.GIF", 0, 0, kOpen, kPrivate, kReadOnly,
kNotMemoryResident);
                  buttonImage = new TGraphicLabel(converter.CreateFrom(aFile));
          }
          catch (TGIFConverter::TGIFConverterException)
          {
                  qprintf("GIF converter error. Make sure button image file is in SharedLibs.\n");
          }
          TPushButton * button = new TPushButton(new TStandardArrowState(), theLabel,
buttonImage);
```

-31-

```
                AdoptChild( button );
                LayoutNext(button);
        }

5      // Push button - pencil tool
        {
                ::qprintf("Creating pencil tool \n");
                TTextLabel* theLabel = new TTextLabel(TStandardText(""),
                                TFontIdentifierStyle(TToken("Chicago")),
10                              TFontPointSizeStyle(12), TTextColorStyle::GetBlack());
                TGIFConverter   converter;
                TGraphicLabel*  buttonImage(NIL);
                try
                {
15                      TFileSegment aFile("Pencil.GIF", 0, 0, kOpen, kPrivate, kReadOnly,
        kNotMemoryResident);
                                buttonImage = new TGraphicLabel(converter.CreateFrom(aFile));
                }
                catch (TGIFConverter::TGIFConverterException)
20              {
                        qprintf("GIF converter error. Make sure button image file is in SharedLibs.\n");
                }

TPushButton * button = new TPushButton(new TStandardArrowState(), theLabel,
25      buttonImage);
                AdoptChild( button );
                LayoutNext(button);
        }

30
        // Push button - eraser tool
        {
                ::qprintf("Creating eraser tool \n");
                TTextLabel* theLabel = new TTextLabel(TStandardText(""),
35                              TFontIdentifierStyle(TToken("Chicago")),
                                TFontPointSizeStyle(12), TTextColorStyle::GetBlack());

TEraserState* tempState = new TEraserState();
                TGIFConverter   converter;
40              TGraphicLabel*  buttonImage(NIL);
                try
                {
                        TFileSegment aFile("Eraser.GIF", 0, 0, kOpen, kPrivate, kReadOnly,
        kNotMemoryResident);
45                              buttonImage = new TGraphicLabel(converter.CreateFrom(aFile));
                }
                catch (TGIFConverter::TGIFConverterException)
                {
                        qprintf("GIF converter error. Make sure button image file is in SharedLibs.\n");
50              }

TPushButton * button = new TPushButton(tempState, theLabel, buttonImage);
                AdoptChild( button );
                LayoutNext(button);
55      }
```

-32-

```
        // Push button - japanese transliteration tool
        {
                ::qprintf("Creating japanese transliteration tool \n");
 5              TTextLabel* theLabel = new TTextLabel(TStandardText(""),
                                TFontIdentifierStyle(TToken("Chicago"),),
                                TFontPointSizeStyle(12), TTextColorStyle::GetBlack());
                TGIFConverter   converter;
                TGraphicLabel*  buttonImage(NIL);
10              try
                {
                        TFileSegment aFile("ZeroFlag.GIF", 0, 0, kOpen, kPrivate, kReadOnly,
        kNotMemoryResident);
                        buttonImage = new TGraphicLabel(converter.CreateFrom(aFile));
15              }
                catch (TGIFConverter::TGIFConverterException)
                {
                        qprintf("GIF converter error.  Make sure button image file is in SharedLibs.\n");
                }
20

TPushButton * button = new TPushButton(new TZeroState(), theLabel, buttonImage);
                AdoptChild( button );
                LayoutNext(button);
25      }

// Push button - american transliteration tool
        {
                ::qprintf("Creating american transliteration tool \n");
30              TTextLabel* theLabel = new TTextLabel(TStandardText(""),
                                TFontIdentifierStyle(TToken("Chicago")),
                                TFontPointSizeStyle(12), TTextColorStyle::GetBlack());
                TGIFConverter   converter;
                TGraphicLabel*  buttonImage(NIL);
35              try
                {
                        TFileSegment aFile("USFlag.GIF", 0, 0, kOpen, kPrivate, kReadOnly,
        kNotMemoryResident);
                        buttonImage = new TGraphicLabel(converter.CreateFrom(aFile));
40              }
                catch (TGIFConverter::TGIFConverterException)
                {
                        qprintf("GIF converter error.\n");
                }
45

TPushButton * button = new TPushButton(new TUSState(), theLabel, buttonImage);
                AdoptChild( button );
                LayoutNext(button);
50      }

TGIFConverter   converter;
55      try
        {
```

-33-

```
            TFileSegment aFile("Palette.GIF", 0, 0, kOpen, kPrivate, kReadOnly,
    kNotMemoryResident);
            fBackground = converter.CreateFrom(aFile);
        }
        catch (TGIFConverter::TGIFConverterException)
        {
            qprintf("GIF converter error. \n");
        }

SetAllocatedArea(TGRect(fBackground->GetLooseFitBounds()));
    } void
    TTextPaletteView::GetBounds ( TGArea& area)          const
    {
      GetAllocatedArea(area);
    } void
    TTextPaletteView::DrawContents (TGrafPort& port)   const
    {
      if (fBackground != NIL)
          fBackground->Draw(port);
    }

// CursorTools.h -- Classes defined in this file:

class MToolHandler;
    class MToolTarget;
    class TTool;
    class TToolInteractor;
    class TToolNegotiator;
    class TToolCommandBinding;

//================================================
    //      class            MToolTarget
    //
    //      description      A mix-in used to identify objects that tools can
    //                       bind their commands to, and to support dynamic
    //                       casting.
    //================================================
    class MToolTarget
```

The C++ code presented below is utilized in a preferred embodiment to declare the objects used in a preferred embodiment of the invention.

-34-

```
{
public:
        MToolTarget ();
        virtual   ~MToolTarget ();
        DynamicCastDeclarationsMacro ();
};

//========================================
//    class           TToolNegotiator
//
//    description     An event handler (usually a view) created a negotiator
//                    and dispatches the current event to it. The negotiator
//                    interfaces with the cursor tools framework to match
//                    a tool with the event. If successful, the tools
//                    framework will call back the tool handler that is
//                    identified to request either a target for the tool to
//                    work on or an interactor for a delegating tool.
//========================================
class TToolNegotiator
{
public:

TToolNegotiator (MToolHandler*, const TViewHandle&, const TGPoint&);
        ~TToolNegotiator ();
        Boolean                 DispatchEvent (TEvent&);
#ifndef NO_Internal
private:
        void*                   fExtension;
        MToolHandler*           fToolHandler;
        TViewHandle             fCoordinateView;
        const TGPoint&          fLocation;
#endif
};
```

-35-

```
//========================================================
//      class           MToolHandler
//
//      description     Mix this in to the part of your application responsible
//                      for supporting the needs of the tools framework. Typically,
//                      MToolHandler is mixed into the view(s) that will support
//                      tools.
//
//                      Override CreateToolTarget to create targets for tools
//                      to work on. The tools framework specifies the location
//                      at which the tool wants to start its interaction and
//                      the type of target that it requires, e.g. MGraphic.
//                      If you can supply a target at that location, then you
//                      do so. Typically, MToolTarget is mixed into your selection
//                      classes that will be changed via tool interaction and
//                      the associated commands.
//
//                      Override CreateToolInteractor to create interactors
//                      for the tool framework to start for you. The tools
//                      framework calls CreateToolInteractor when a delegating
//                      tool wants to work on your view. A delegating tool
//                      is a tool that has polymorphic behavior across applications
//                      and is target-type neutral, e.g. the arrow tool. Your
//                      application is provided with a hint of the tool type
//                      (essentially a way of describing the graphic). You
//                      produce the interactor and all that it does, e.g. embedded
//                      command and target.
//
//                      Override methods that process TToolCommandBindings to
//                      implement a doing mechanism for your application.
//                      For example, a BAF application can turn around and
//                      call the respective methods in the binding while a
//                      CDF application must produce a TDocumentComponentTool-
//                      CommandBinding (or somethnig like it) to pass into
//                      the respective document surrogate methods.
//
//                      Feedback methods are provided for handlers to provide
```

-36-

```
//                      tool interactors with an inexpensive way to draw simple
//                      interactive feedback over the associated view. The
//                      handler may implement these any appropriate way. A
//                      implementation is provided for handlers that do not
//                      support feedback.
//====================================================== class MToolHandler
{
    public:

virtual
        ~MToolHandler ();

//======================================================
        // MToolHandler Methods
        //====================================================== virtual MToolTarget*     CreateToolTarget (const TTypeDescription&, const TGPoint&);
        virtual TToolInteractor* CreateToolInteractor (const TGPoint&, const TToken& hint);

virtual void             AdoptAndDo (TToolCommandBinding*) = 0;
        virtual void             DoBegin (TToolCommandBinding&) = 0;
        virtual void             DoIncrement (TToolCommandBinding&) = 0;
        virtual void             AdoptAndDoEnd (TToolCommandBinding*) = 0;

virtual Boolean  SupportsFeedback () const;
        virtual void     AdoptFeedbackGraphic (MGraphic*, const TGArea& total, const TGArea& changed);
        virtual MGraphic* OrphanFeedbackGraphic (Boolean repair = TRUE);

protected:

// For subclasses
        MToolHandler ();
};
```

-37-

```
//========================================
//      class    TToolInteractor
//
//      description    Base class for all tool interactors.
//======================================== class TToolInteractor : public TInteractor
{
public:

TToolInteractor (MToolHandler*);

TToolInteractor (const TToolInteractor& source);

virtual         ~TToolInteractor ();

//========================================
        // Metadata
        //========================================

VersionDeclarationsMacro (TToolInteractor);

protected:

//========================================
        // TToolInteractor methods
        //========================================

MToolHandler*   GetToolHandler ();

virtual void    AdoptAndDo (TToolCommandBinding*);
        virtual void    DoBegin (TToolCommandBinding&);
        virtual void    DoIncrement (TToolCommandBinding&);
        virtual void    AdoptAndDoEnd (TToolCommandBinding*);

#ifndef NO_Internal
private:
```

-38-

```
            void*               fExtension;
            MToolHandler*       fToolHandler;
    #endif
    };

//================================================
    //      class     TTool
    //
    //  description           Base class for all tools.
    //================================================
    class TTool :   public MCollectible,
                    public MEventTarget
    {
    public:

enum EToolType { kSimpleTool, kDelegatingTool };

TTool ();
            TTool (TTool::EToolType);
            TTool (TTool::EToolType, const TTypeDescription&);
            TTool (const TTool&);

virtual             ~TTool ();

//================================================
            // MCollectible overrides
            //================================================

MCollectibleDeclarationsMacro (TTool);

virtual Boolean     IsEqual (const MCollectible*) const;
            virtual long        Hash () const;
            TTool&              operator= (const TTool&);
            TStream&            operator>>= (TStream&) const;
            TStream&            operator<<= (TStream&);

//================================================
```

-39-

```
// TTool methods
//================================================ virtual EToolType         GetToolType () const;
        virtual TTypeDescription  GetTargetType ();

virtual void              AdoptTarget (MToolTarget*);
        virtual MToolTarget*      OrphanTarget ();
        virtual MToolTarget*      GetTarget ();

virtual TGPoint           GetLocation () const;
        virtual void              SetLocation (const TGPoint&);

virtual void              SetToolHandler (MToolHandler*);
        virtual MToolHandler*     GetToolHandler ();

virtual void              SetCoordinateView (const TViewHandle&);
        virtual TViewHandle       GetCoordinateView ();

virtual MGraphic*         CreatePaletteGraphic () const;
        virtual void              GetPaletteText (TText&) const;
        virtual MGraphic*         CreateCursorGraphic () const;

//================================================
// Tool Server Access through TTool
//================================================ static void               SetCurrentTool (const TTool&);
        static TTool*             CopyCurrentTool ();

#ifndef NO_Internal
private:
        void*                     fExtension;

TGlobalID                 fID;
        EToolType                 fToolType;
        TTypeDescription          fTargetType;
```

-40-

```
            MToolTarget*        fTarget;
            TViewHandle         fCoordinateView;
            TGPoint             fLocation;
 5          MToolHandler*       fToolHandler;

static TTool*       fgCurrentTool;

enum Version { kOriginalVersion };
10      #endif
        };

//================================================
15  //      class   TToolCommandBindingTo
    //
    //  description     Base class for templatized tool command bindings
    //                  that permits access of target as MToolTarget.
    //================================================
20
    class TToolCommandBinding : public TCommandBinding
    {
      public:

25          TToolCommandBinding ();
            TToolCommandBinding (const TToolCommandBinding&);

virtual             ~TToolCommandBinding ();

30          //================================================
            // MCollectible overrides
            //================================================

VersionDeclarationsMacro (TToolCommandBinding);
35
            TToolCommandBinding&    operator= (const TToolCommandBinding&);
            virtual TStream&        operator>>= (TStream&) const;
            virtual TStream&        operator<<= (TStream&);
```

-41-

```
//========================================
// TToolCommandBinding Methods
//======================================== void            AdoptToolTarget (MToolTarget*);
        MToolTarget*    GetToolTarget ();
        const MToolTarget*    GetToolTarget () const;

#ifndef NO_Internal
    private:
        void*                   fExtension;
        TDeleterFor<MToolTarget>    fToolTarget;

enum Version { kOriginalVersion };
#endif
};

//========================================
//      class    TToolCommandBindingTo<ATarget>
//
// description       A tool command binding that is templatized on the
//                   type of the target that the command requires.
//======================================== template <class ATarget>
class TToolCommandBindingTo : public TToolCommandBinding
{
  public:

TToolCommandBindingTo (TCommandOn<ATarget>*, ATarget*);
        TToolCommandBindingTo (const TToolCommandBindingTo<ATarget>&);

virtual            ~TToolCommandBindingTo ();

//========================================
        // MCollectible overrides
```

-42-

```
//================================================

TemplateDeclarationsMacro (TToolCommandBindingTo, ATarget, 0);

TToolCommandBindingTo<ATarget>&    operator= (const
TToolCommandBindingTo<ATarget>&);
        virtual TStream&          operator>>= (TStream&) const;
        virtual TStream&          operator<<= (TStream&);

protected:

//================================================
        // TCommandBinding overrides
        //================================================ virtual void              Do ();

virtual void              DoBegin ();
        virtual void              DoIncrement ();
        virtual void              DoEnd ();

virtual void              Undo ();
        virtual void              Redo ();

virtual void              Commit ();

virtual TCommonCommand::UndoType   GetUndoType () const;

virtual Boolean           CanDo () const;
        virtual Boolean           CanUndo () const;
        virtual Boolean           CanRedo () const;

//================================================
        // TToolCommandBindingTo Methods
        //================================================

ATarget*                  GetTarget ();
        const ATarget*            GetTarget () const;
```

-43-

```
            //====================================
            // Protected Constructor for Streaming
            //====================================

TToolCommandBindingTo ();

#ifndef NO_Internal
         private:
            void*                   fExtension;
            TDeleterFor< TCommandOn<ATarget> >   fCommand;
       #endif
       };

// MouseCursorTools.h -- Classes defined in this file:

class TDelegatingMouseTool;
class TSimpleMouseTool;
//====================================
//      class     TDelegatingMouseTool
//
// description        A delegating cursor tool that starts interaction
//                    on mouse down. It uses mouse down to ask the
//                    tool hander to create a default tool interactor
//                    which it starts.
//==================================== class TDelegatingMouseTool :    public TTool, public MMouseEventHandler
{ public:

TDelegatingMouseTool ();
            TDelegatingMouseTool (const TDelegatingMouseTool&);

virtual                 ~TDelegatingMouseTool ();

//====================================
```

-44-

```
// MCollectible overrides
//===============================================

VersionDeclarationsMacro (TDelegatingMouseTool);

// NOTE:          TTool subclasses need not implement IsEqual or
        //         Hash since TTool provides implementations based
        //         on global IDs.

TDelegatingMouseTool&  operator= (const TDelegatingMouseTool&);
        TStream&               operator>>= (TStream&) const;
        TStream&               operator<<= (TStream&);

//===============================================
// MMouseEventHandler Overrides
//=============================================== virtual Boolean        MouseDown (TMouseDownEvent&);

//===============================================
// TDelegatingMouseTool Methods
//===============================================
    protected:

virtual TToken         GetHint () const = 0;

#ifndef NO_Internal
    private:
        void*                  fExtension;

enum Version { kOriginalVersion };
#endif
};

//===============================================
//      class    TSimpleMouseTool
```

-45-

```
        //
        // description        A simple cursor tool that uses mouse down to create
        //                    and start an interactor. It starts its own interactor
        //                    which is supplied by a subclass that overrides
5       //                    CreateInteractor.
        //======================================================== class TSimpleMouseTool :        public TTool,
                                        public MMouseEventHandler
10      { public:

TSimpleMouseTool ();
15              TSimpleMouseTool (const TTypeDescription&);
                TSimpleMouseTool (const TSimpleMouseTool&);

virtual  ~TSimpleMouseTool ();

20              //========================================================
                // MCollectible overrides
                //========================================================

VersionDeclarationsMacro (TSimpleMouseTool);
25
                // NOTE:    TTool subclasses need not implement IsEqual or
                //          Hash since TTool provides implementations based
                //          on global IDs.

30              TSimpleMouseTool&   operator= (const TSimpleMouseTool&);
                TStream&            operator>>= (TStream&) const;
                TStream&            operator<<= (TStream&);

//========================================================
35              // MMouseEventHandler Overrides
                //======================================================== virtual Boolean     MouseDown (TMouseDownEvent&);
```

-46-

```
//===============================
// TSimpleMouseTool Methods
//=============================== virtual TToolInteractor*        CreateInteractor () = 0;

ifndef NO_Internal
    private:
        void*                   fExtension;

enum Version { kOriginalVersion };
#endif
};

// StandardArrowTool.h -- Classes defined in this file:
class TStandardArrowTool;
//===============================
//      class   TStandardArrowTool
//
// description         A delegating tool with an arrow appearance that
//                     starts an application-supplied interactor on mouse
//                     down.
//=============================== class TStandardArrowTool : public TDelegatingMouseTool
{
  public:

TStandardArrowTool ();
        TStandardArrowTool (const TStandardArrowTool&);

virtual ~TStandardArrowTool ();

//===============================
        // MCollectible overrides
        //===============================
```

-47-

```
            MCollectibleDeclarationsMacro (TStandardArrowTool);

// NOTE: TTool subclasses need not implement IsEqual or
            //       Hash since TTool provides implementations based on global IDs.

TStandardArrowTool&        operator= (const TStandardArrowTool&);
            TStream&                   operator>>= (TStream&) const;
            TStream&                   operator<<= (TStream&);

//==========================================
            // TTool overrides
            //========================================== virtual MGraphic*          CreatePaletteGraphic () const;
            virtual void               GetPaletteText (TText&) const;
            virtual MGraphic*          CreateCursorGraphic () const;

//==========================================
            // TDelegatingMouseTool overrides
            //========================================== protected:

virtual TToken             GetHint () const;

#ifndef NO_Internal
        private:
            void*                      fExtension;

enum Version { kOriginalVersion };
        #endif
        };

// CursorToolSelectionState.h -- Classes defined in this file:
```

-48-

```
// TCursorToolSelectionState
//================================
// class    TCanvasCursorToolSelectionState
//
// description           Selects the current cursor tool.
//================================
class TCursorToolSelectionState : public MMomentaryControlState
{
  public:

TCursorToolSelectionState (TTool* adoptTool);
            TCursorToolSelectionState (const TCursorToolSelectionState&);

virtual             ~TCursorToolSelectionState ();

//================================
    // MCollectible Overrides
    //================================

MCollectibleDeclarationsMacro (TCursorToolSelectionState);

TCursorToolSelectionState&    operator= (const TCursorToolSelectionState&);
    virtual TStream&      operator>>= (TStream&) const;
    virtual TStream&      operator<<= (TStream&);

//================================
    // MMomentaryControlState Overrides
    //================================

// Select is called when the momentary control is selected.
    // It calls TTool::SetCurrentTool with the adopted tool
    // (which is copied by TTool, not adopted).

virtual void          Select ();

protected:

// For subclasses and MCollectible streaming
```

-49-

```
              TCursorToolSelectionState ();

#ifndef NO_Internal
          private:
5             void*          fExtension;
              TDeleterFor<TTool>    fTool;

enum Version { kOriginalVersion };
          #endif
10        };

// ToolCommandBindingImplementation.h -- Classes defined in this file:
15        //    template class TToolCommandBindingTo<ATarget>

//======================================
          // Constructors and destructor
          //======================================
20
          template <class ATarget>
          TToolCommandBindingTo<ATarget>::TToolCommandBindingTo () :
            TToolCommandBinding (),
            fCommand (NIL)
25        {
          } template <class ATarget>
          TToolCommandBindingTo<ATarget>::TToolCommandBindingTo (TCommandOn<ATarget>*
30      adoptCommand, ATarget* adoptTarget) :
            TToolCommandBinding (),
            fCommand (adoptCommand)
          {
            MToolTarget* toolTarget;
35
            DynamicCastTo (toolTarget, adoptTarget);

if ( toolTarget != NIL )
```

-50-

```
              AdoptToolTarget (toolTarget);
       else
              delete adoptTarget;
       }
5
       template <class ATarget>
       TToolCommandBindingTo<ATarget>::TToolCommandBindingTo (const
  TToolCommandBindingTo<ATarget>& source) :
       TToolCommandBinding (source),
10     fCommand (NIL)
       {
       fCommand = (TCommandOn<ATarget>*)MCollectible::ClonePointer (source.fCommand);
       }

15     template <class ATarget>
       TToolCommandBindingTo<ATarget>::~TToolCommandBindingTo ()
       {
       }
       //==========================================================
20     // MCollectible overrides
       //==========================================================

TemplateDefinitionsMacro (TToolCommandBindingTo, ATarget);

25     template <class ATarget>
       TToolCommandBindingTo<ATarget>&
       TToolCommandBindingTo<ATarget>::operator= (const TToolCommandBindingTo<ATarget>&
  source)
       {
30     if ( &source != this ) {
              TToolCommandBinding::operator= (source);
              fCommand = ::Copy (source.fCommand.GetObject());
              }
       return *this;
35     } template <class ATarget>
```

-51-

```
    TStream&
    TToolCommandBindingTo<ATarget>::operator>>= (TStream& toWhere) const
    {
      TToolCommandBinding::operator>>= (toWhere);
5     ::Flatten (fCommand.GetObject(), toWhere);
      return toWhere;
    }

10  template <class ATarget>
    TStream&
    TToolCommandBindingTo<ATarget>::operator<<= (TStream& fromWhere)
    {
      TToolCommandBinding::operator<<= (fromWhere);
15    TCommandOn<ATarget>* temp = NIL;
      ::Resurrect (temp, fromWhere);
      fCommand = temp;
      return fromWhere;
    }
20

//===================================
    // TCommandBinding overrides
    //===================================
25 template <class ATarget>
    void
    TToolCommandBindingTo<ATarget>::Do ()
30  {
      fCommand->Do (*GetTarget());
    }

35  template <class ATarget>
    void
    TToolCommandBindingTo<ATarget>::DoBegin ()
    {
```

```
            fCommand->DoBegin (*GetTarget());
          }

5       template <class ATarget>
          void
          TToolCommandBindingTo<ATarget>::DoIncrement ()
          {
            fCommand->DoIncrement (*GetTarget());
 10       } template <class ATarget>
          void
 15       TToolCommandBindingTo<ATarget>::DoEnd ()
          {
            fCommand->DoEnd ();
          }

20
          template <class ATarget>
          void
          TToolCommandBindingTo<ATarget>::Undo ()
          {
 25         fCommand->Undo (*GetTarget());
          } template <class ATarget>
 30       void
          TToolCommandBindingTo<ATarget>::Redo ()
          {
            fCommand->Redo (*GetTarget());
          }
 35 template <class ATarget>
          void
```

-53-

```
TToolCommandBindingTo<ATarget>::Commit ()
{
  fCommand->Commit ();
} template <class ATarget>
TCommonCommand::UndoType
TToolCommandBindingTo<ATarget>::GetUndoType () const
{
  return fCommand->GetUndoType ();
} template <class ATarget>
Boolean
TToolCommandBindingTo<ATarget>::CanDo () const
{
  return fCommand->CanDo (*GetTarget());
} template <class ATarget>
Boolean
TToolCommandBindingTo<ATarget>::CanUndo () const
{
  return fCommand->CanUndo (*GetTarget());
} template <class ATarget>
Boolean
TToolCommandBindingTo<ATarget>::CanRedo () const
{
  return fCommand->CanRedo (*GetTarget());
}
```

-54-

```
       template <class ATarget>
       ATarget*
       TToolCommandBindingTo<ATarget>::GetTarget ()
       {
 5       ATarget* target = NIL;
         MToolTarget* toolTarget = GetToolTarget ();
         if ( toolTarget != NIL ) DynamicCastTo (target, toolTarget);

return target;
10     } template <class ATarget>
       const ATarget*
15     TToolCommandBindingTo<ATarget>::GetTarget () const
       {
         ATarget* target = NIL;
         const MToolTarget* toolTarget = GetToolTarget ();
         if ( toolTarget != NIL ) DynamicCastTo (target, toolTarget);
20
         return target;
       }

// ToolServer.h -- Classes defined in this file:
25
       class MGraphic;
       class TStream;
       class TTool;
       class TToolNegotiator;
30     class TStandardText;
       class TToolServer;
       class TCursor;

class TToolServer : public MRemoteDispatcher
35     {
       public:
         MCollectibleDeclarationsMacro(TToolServer);
```

```
enum EToolServerRequest
{
        kSetCursorShape,
        kBindTool,
        kGetBoundTool,
        kMaxRequest = kGetBoundTool
};

TToolServer();
TToolServer(const TToolServer& copy);
virtual ~TToolServer();

TToolServer& operator=(const TToolServer& assign);
virtual TStream& operator>>=(TStream& writeTo) const;
virtual TStream& operator<<=(TStream& readFrom);

// Const for server name
static const TStandardText& kToolServerName;

// Interfaces for Binding a tool
virtual void            SetCursorShape(TTool* theSurr) const;
virtual void            BindTool(TTool* theTool);
virtual TTool*          GetBoundTool() const;

private:
    enum    { kOriginalVersion };
    void    PrivateConstruction();
    void    RequestSetCursorShape(TStream& argStream, TStream& resultStream);
    void    RequestBindTool(TStream& argStream, TStream& resultStream);
    void    RequestGetBoundTool(TStream& , TStream& resultStream);

TTool*      fDefaultTool;
    TTool*      fCurrentTool;
    TCursor*                fTheCursor;
};

// ToolServerThread.h -- Classes defined in this file:
```

-56-

```
class TToolServerThread:
//----------------------------------------------------------
//      ToolServerThread interface
//---------------------------------------------------------- class TToolServerThread : public TThreadProgram
{
public:
    MCollectibleDeclarationsMacro(TToolServerThread);

TToolServerThread();
            TToolServerThread(const TToolServerThread& copy);
    virtual ~TToolServerThread();

TToolServerThread&  operator=(const TToolServerThread& assign);

virtual TStream&    operator>>=(TStream& writeTo) const;
    virtual TStream&    operator<<=(TStream& readFrom);

virtual void        Run();

private:
    enum { kOriginalVersion };
};
// ToolCallers.h -- Classes defined in this file:
class TToolServerCaller;

class TToolServerCaller : public MRemoteCaller
{ public:
            TToolServerCaller();
            TToolServerCaller(const TToolServerCaller&);
    virtual ~TToolServerCaller();

MCollectibleDeclarationsMacro(TToolServerCaller);
```

-57-

```
        void            SetTool(const TTool& theTool);
        TTool*          CopyTool(); // you are responsible for the memory private:
5       TMessageStreamsTransport*     fTransport;
        void            Initialize();
        MRemoteCallerDeclarationsMacro(TToolServer);
        };
```

Figure 25:
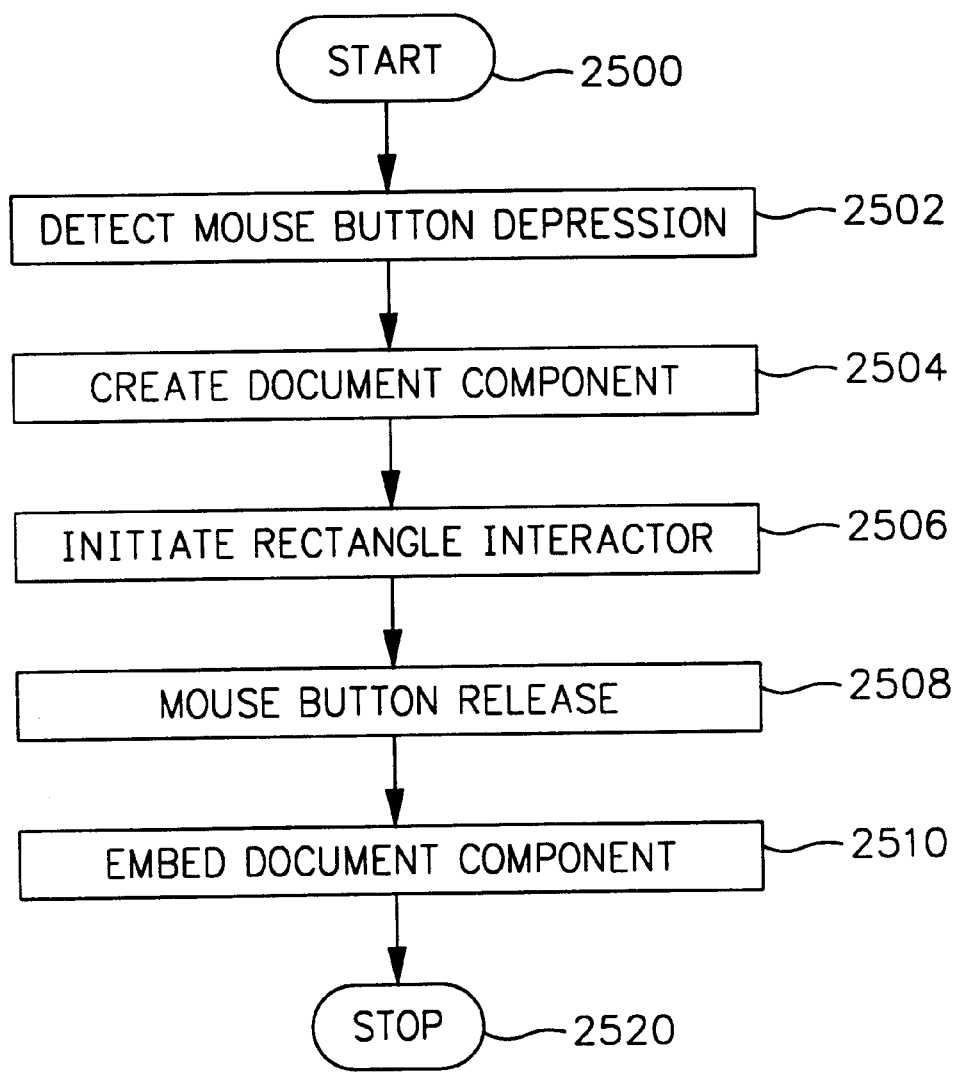
FIG. 25 is a flowchart of frame tool processing in accordance with a preferred embodiment.

FIG. 25 is a flowchart of the detailed logic associated with a frame creation tool in accordance with a preferred embodiment. Processing commences at terminal 2500 and immediately passes to function block 2502 to await the detection of a mouse button depression. Then, at function block 2504, a document component is created. The document component type is assigned at a tools inception. Then, at function block 2506, a rectangle interactor is invoked. The rectangle interactor provides a rubber band GUI pivoting around a first selected point. The interactor continues to process until the mouse button is released at function block 2508. Finally, at function block 2510 the document component is embedded in the previously created frame. A C++ listing in accordance with a preferred embodiment is presented below. The code is used to create the frame tool as described above in conjunction with the flowchart presented in FIG. 25.

```
template <class AModel,class APresenterState>
TToolInteractor*
TFrameCreationToolFor<AModel,APresenterState>::CreateInteractor ( )
{
//create the document component to embedd
TDocumentComponent *editDocument =
     new TDocumentComponent(new AModel, new APresenterState);
//create the embedder model
TEmbedderModel *model = new TEmbedderModel(editDocument);
TFrameEmbedderDragInteractor *interactor =
     new TFrameEmbedderDragInteractor(GetToolHandler( ),model);
interactor->SetCoordinateView (GetCoordinateView( ));
return interactor;
}
void TFrameEmbedderDragInteractor::EndInteraction ( )
{
MFrameToolHandler *handler = (MFrameToolHandler *)
   GetToolHandler( );
handler->AdoptEmbedderModel(fModelToEmbed.
                           GetBounds( ).GetTopLeft( ),
                           GetBounds( ).GetBottomRight( ));
}
void TSimpleEmbedderContentView::AdoptEmbedderModel(
                           TEmbedderModel* theModel,
                           TGPoint whereDropped.
                           TGPoint frameSize)
{
TSimpleEmbedderSelection* theSelection =
     new TSimpleEmbedderSelection( GetModelReference( ) );
theSelection->SetInsertionPoint(whereDropped);
theSelection->SetFrameSize(frameSize);
TAbsorbDataCommand* theCommand =
     new TAbsorbDataCommand(theModel);
TDocumentComponentCommandBindingTo<MDataExchanger>*
     theBinding = NIL;
theBinding =
     new TGUIDocumentComponentCommandBindingTo<
       MDataExchanger>(
                           theCommand,
                           theSelection, *GetGUIBundle( ),
                           TStandardText("Accept Drop"));
::NonConst( (TDocumentComponentView *)
   this)->AdoptAndDo( theBinding);
}
```

While the invention has been described in terms of a preferred embodiment in a specific system environment, those skilled in the art will recognize that the invention can be practiced, with modification, in other and different hardware and software environments within the spirit and scope of the appended claims.

We claim:

1. A method for performing operations on a computer with a display device for generating a screen display having a plurality of frame areas, each of the plurality of frame areas being generated by an application program and comprising a visual representation of data, a movable pointing device, a selection means, means for generating a cursor location and means responsive to movement of the pointing device for moving the cursor location to various screen display locations, the method comprising the steps of:

(a) creating a tool server object containing information identifying a single cursor tool which operates across the plurality of frame areas, each of the frame areas being a different frame type and methods for determining frame types in which data can be manipulated by the cursor tool;

(b) detecting a selection signal generated by the selection means;

(c) identifying a cursor location on the screen display when the selection signal is detected;

(d) determining one frame area of the plurality of frame areas enclosing the cursor location and a frame type of the one frame area;

(e) causing the application program to call one of the methods in the tool server object in order to determine whether the cursor tool can operate on the data in the frame type of the one frame area;

(f) modifying data within the frame area displayed at the cursor location in accordance with the cursor tool when the cursor tool can operate with the frame type of the one frame area; and (g) displaying predetermined default cursor graphic data at the cursor location when the cursor tool cannot operate with the frame type of the one frame area.

2. A method as recited in claim 1, wherein the application program operates in an address space and wherein step (f) comprises the steps of:

(f1) creating a tool object comprising methods for modifying data within the frame area displayed at the cursor location in an address space different from the application address space; and (f2) calling a method in the tool object to modify data.

3. A method as recited in claim 1, wherein step (a) comprises the steps of:

(a1) displaying a menu of tool objects; (a2) obtaining identification information identifying an active one of the menu of tool objects; (a3) calling a method in the tool server object to store the identification information in the tool server object; and (a4) visually modifying the active tool object in the menu of tool objects to indicate the active cursor tool.

4. A method as recited in claim 3, wherein step (a2) comprises the step of selecting a tool object from the menu of tool objects.

5. A method as recited in claim 3, wherein step (a2) comprises the step of displaying a tool object in the menu of tool objects.

6. A method as recited in claim 1, wherein the tool server object includes cursor graphic information corresponding to the cursor tool and step (g) comprises the step of: (g3) displaying the cursor graphic information at the cursor location.

7. A method as recited in claim 6, wherein step (a) comprises the step of: (a5) creating a tool server object containing cursor graphic information which depends on the cursor tool.

8. A method as recited in claim 6, wherein step (a) comprises the step of: (a6) creating a tool server object containing cursor graphic information which depends on the cursor tool state.

9. An apparatus for cursor tool processing, comprising:

(a) a processor;

(b) a storage attached to and under the control of the processor;

(c) a display attached to and under the control of the processor for generating a screen display having a plurality of frame areas, each of the plurality of frame areas being generated by an application program and comprising a visual representation of data;

(d) means for creating a tool server object containing information identifying a single cursor tool which operates across a plurality of frame areas, each of the plurality of frame areas being a different frame type and methods for determining frame types in which data can be manipulated by the cursor tool;

(e) a movable pointing device;

(f) means for generating a cursor location, the generating means being responsive to movement of the pointing device for moving the cursor location to various screen display locations;

(g) means for detecting a selection signal;

(h) means for identifying a cursor location on the screen display when the selection signal is detected;

(i) means responsive to the cursor location for determining one frame area of the plurality of frame areas enclosing the cursor location and a frame type of the one frame area;

(j) means responsive to the determination of the one frame for calling one of the methods in the tool server object in order to determine whether the cursor tool can operate on the data in the frame type in the one frame area;

(k) means, responsive to the detection of a selection signal, for modifying data in the frame area enclosing the cursor location in accordance with the cursor tool when the cursor tool can operate with the frame type of the one frame area; and (l) means responsive to the detection of a selection signal for displaying predetermined default cursor graphic data at the cursor location when the cursor tool cannot operate with the frame type of the one frame area.

10. An apparatus as recited in claim 9, wherein the application program operates in an address space and wherein the data modifying means comprises a tool object containing methods for modifying data in the frame area enclosing the cursor location in an address space different from the application address space; and means responsive to the selection signal for calling a method in the tool object to modify data.

11. An apparatus as recited in claim 10, wherein the tool server creation means comprises:

means controlled by the processor for displaying a menu of tool objects on the screen display;

means for obtaining identification information identifying an active one of the menu of tool objects;

means responsive to the identification information for calling a method in the tool server object to store the identification information in the tool server object; and means responsive to the identification information for visually modifying the active tool object in the menu of tool objects to indicate the active cursor tool.

12. An apparatus as recited in claim 11, wherein the tool server creation means comprises means for selecting a tool object from the menu of tool objects.

13. An apparatus as recited in claim 11, wherein the tool server creation means comprises means for displaying a tool object in the menu of tool objects.

14. An apparatus as recited in claim 9, wherein the tool server object includes cursor graphic information corresponding to the cursor tool and the data modifying means comprises means for displaying the cursor graphic information at the cursor location.

15. An apparatus as recited in claim 9, wherein the tool server creation means comprises means for creating a tool server object containing cursor graphic information which depends on the cursor tool.

16. An apparatus as recited in claim 9, wherein the tool server creation means comprises means for creating a tool server object containing cursor graphic information which depends on the cursor tool state.

17. A method for performing cursor tool operations on a computer having a memory, an object-oriented operating system, a plurality of application programs, and an attached display for generating a screen display having a plurality of different frame regions, each frame region comprising a visual representation of data with a specific frame type and containing data generated by one of the plurality of application programs, the computer system further having a movable pointing device, means responsive to movement of the pointing device for generating a cursor location and moving the cursor location to various screen display locations and means responsive to the cursor location for associating therewith a current cursor tool, the method comprising the steps of:

(a) detecting that the cursor location has entered a first one of the plurality of the frame regions on the screen display;

(b) obtaining the current cursor tool corresponding to the detected cursor location;

(c) obtaining a tool negotiator object corresponding to the current cursor tool, the tool negotiator object comprising current cursor tool information indicating frame types in which data can be manipulated by the current cursor tool and a method for interrogating the current cursor tool information;

(d) calling the tool negotiator object method to determine if the current cursor tool can manipulate data within the one frame region on the screen display;

(e) obtaining cursor graphic information corresponding to the current cursor tool; and (f) displaying the cursor graphic information at the cursor location when the current cursor tool can manipulate data within the one frame region.

18. A method as recited in claim 17, wherein step (d) includes the following steps:

(d1) obtaining a list of frame types in which data can be manipulated by the current cursor tool; and (d2) comparing the list of frame types with a frame type of the one frame region on the screen display.

19. A method as recited in claim 17, wherein the pointing device comprises a selection means and the method comprises the steps of:

(g) detecting a selection signal generated by the selection means;

(h) obtaining a tool interactor object from the tool negotiator object, the tool interactor object containing a method for modifying data in the one frame region;

(i) transferring control to the tool interactor object; and (j) using the tool interactor object method for modifying data in the one frame region at the cursor location.

20. A method as recited in claim 17, including the step of embedding a new frame region within the first frame region on the screen display, the new frame region having a frame type different from the frame type of the first frame region.

21. A method for performing operations on a computer with a display device for generating a screen display having a plurality of frame areas, each of the plurality of frame areas being generated by one of a plurality of application programs, having a frame type and comprising a visual representation of data, the computer further including a movable pointing device, a selection means, means for generating a cursor location and means responsive to movement of the pointing device for moving the cursor location to various screen display locations, the method comprising the steps of:

(a) creating a tool server object containing information identifying a single cursor tool which operates across the plurality of frame areas and methods for determining frame types in which data can be manipulated by the cursor tool;

(b) detecting a selection signal generated by the selection means;

(c) identifying a cursor location on the screen display when the selection signal is detected;

(d) determining one frame area of the plurality of frame areas enclosing the cursor location and a frame type of the one frame area;

(e) determining which application program of the plurality of application programs generated the one frame area;

(f) causing the application program which generated the one frame area to call one of the methods in the tool server object in order to determine whether the cursor tool can operate on the frame type of the one frame area;

(g) modifying data within the frame area displayed at the cursor location in accordance with the cursor tool when the cursor tool can operate with the frame type of the one frame area; and (h) displaying predetermined default cursor graphic data at the cursor location when the cursor tool cannot operate with the frame type of the one frame area.

22. A method as recited in claim 21, wherein the application program which generated the one frame area operates in an address space and wherein step (g) comprises the steps of:

(g1) creating a tool object comprising methods for modifying data within the frame area displayed at the cursor location in an address space different from the application address space; and (g2) calling a method in the tool object to modify data.

23. A method as recited in claim 21, wherein step (a) comprises the steps of:

(a1) displaying a menu of tool objects;

(a2) obtaining identification information identifying an active one of the menu of tool objects;

(a3) calling a method in the tool server object to store the identification information in the tool server object; and (a4) visually modifying the active tool object in the menu of tool objects to indicate the active cursor tool.

24. A method as recited in claim 23, wherein step (a2) comprises the step of:

(a2a) selecting a tool object from the menu of tool objects.

25. A method as recited in claim 23, wherein step (a2) comprises the step of:

(a2b) displaying a tool object in the menu of tool objects.

26. A method as recited in claim 23, wherein step (a) comprises the step of:

(a5) creating a tool server object containing cursor graphic information which depends on the cursor tool.

27. A method as recited in claim 26, wherein the tool server object includes cursor graphic information corresponding to the cursor tool and step (g) comprises the step of:

(g3) displaying the cursor graphic information at the cursor location.

28. A method as recited in claim 26, wherein step (a) comprises the step of:

(a6) creating a tool server object containing cursor graphic information which depends on the cursor tool state.

29. An apparatus for cursor tool processing, comprising:

(a) a processor;

(b) a storage attached to and under the control of the processor;

(c) a display attached to and under the control of the processor for generating a screen display having a plurality of frame areas, each of the plurality of frame areas being generated by one of a plurality of application programs and comprising a visual representation of data;

(d) means for creating a tool server object containing information identifying a single cursor tool which operates across a plurality of frame areas, each of the plurality of frame areas being a different frame type and methods for determining frame types in which data can be manipulated by the cursor tool;

(e) a movable pointing device;

(f) means for generating a cursor location, the generating means being responsive to movement of the pointing device for moving the cursor location to various screen display locations;

(g) means for detecting a selection signal;

(h) means for identifying a cursor location on the screen display when the selection signal is detected;

(i) means responsive to the cursor location for determining one frame area of the plurality of frame areas enclosing the cursor location and a frame type of the one frame area;

(j) means responsive to the determination of the one frame for determining one of the plurality of application programs corresponding to the one frame;

(k) means responsive to the determination of the one frame for calling one of the methods in the tool server object in order to determine whether the cursor tool can operate on the data in the frame type in the one frame area;

(l) means, responsive to the detection of a selection signal, for modifying data in the frame area enclosing the cursor location in accordance with the cursor tool when the cursor tool can operate with the frame type of the one frame area; and (m) means responsive to the detection of a selection signal for displaying predetermined default cursor graphic data at the cursor location when the cursor tool cannot operate with the frame type of the one frame area.

30. An apparatus as recited in claim 29, wherein the application program operates in an address space and wherein the data modifying means comprises a tool object containing methods for modifying data in the frame area enclosing the cursor location in an address space different from the application address space; and means responsive to the selection signal for calling a method in the tool object to modify data.

31. An apparatus as recited in claim 29, wherein the tool server object creating means comprises:

means for displaying a menu of tool objects;

means responsive to the selection signal for obtaining identification information identifying an active one of the menu of tool objects;

means controlled by the application program for calling a method in the tool server object to store the identification information in the tool server object; and means for visually modifying the active tool object in the menu of tool objects to indicate the active cursor tool.

32. An apparatus as recited in claim 31, wherein the means for obtaining identification information identifying an active one of the menu of tool objects comprises means for selecting a tool object from the menu of tool objects.

33. An apparatus as recited in claim 31, wherein the means for obtaining identification information identifying an active one of the menu of tool objects comprises means for displaying a tool object in the menu of tool objects.

34. An apparatus as recited in claim 31, wherein the means for obtaining identification information identifying an active one of the menu of tool objects comprises means for creating a tool server object containing cursor graphic information which depends on the cursor tool.

35. An apparatus as recited in claim 34, wherein the tool server object includes cursor graphic information corresponding to the cursor tool and wherein the data modifying means comprises means for displaying the cursor graphic information at the cursor location.

36. An apparatus as recited in claim 35, wherein the tool server object creating means comprises means for creating a tool server object containing cursor graphic information which depends on the cursor tool state.

* * * * *